US005404257A

United States Patent [19]
Alt

[11] Patent Number: 5,404,257
[45] Date of Patent: Apr. 4, 1995

[54] ROTARY INERTIAL LATCH FOR DISK DRIVE ACTUATOR

[75] Inventor: Robert A. Alt, Longmont, Colo.

[73] Assignee: Integral Peripherals, Inc., Boulder, Colo.

[21] Appl. No.: 144,762

[22] Filed: Oct. 28, 1993

Related U.S. Application Data

[63] Continuation-in-part of Ser. No. 765,353, Sep. 25, 1991, Pat. No. 5,296,986, which is a continuation-in-part of Ser. No. 629,929, Dec. 19, 1990, Pat. No. 5,189,576.

[51] Int. Cl.⁶ .......................... G11B 5/54; G11B 21/22
[52] U.S. Cl. .................... 360/105; 360/106; 292/229; 292/DIG. 22
[58] Field of Search ............... 360/97.01, 98.01, 99.01, 360/106, 104, 105, 133; 292/129, 229, DIG. 22

[56] References Cited

U.S. PATENT DOCUMENTS

| | | | |
|---|---|---|---|
| 3,984,873 | 10/1976 | Pejcha | 360/105 |
| 4,071,851 | 1/1978 | Johnson | 354/354 |
| 4,346,924 | 8/1982 | Herriott | 292/129 |
| 4,438,974 | 3/1984 | Kresky et al. | 292/DIG. 22 |
| 4,518,904 | 5/1985 | Macleod et al. | 360/78 |
| 4,535,374 | 8/1985 | Anderson et al. | 360/103 |
| 4,559,571 | 12/1985 | Olmsted et al. | 360/105 |
| 4,562,500 | 12/1985 | Bygdnes | 360/98.01 |
| 4,638,383 | 1/1987 | McGinlay et al. | 360/77 |
| 4,647,997 | 3/1987 | Westwood | 360/105 |
| 4,716,480 | 12/1987 | Wiens et al. | 360/105 |
| 4,725,907 | 2/1988 | Jue | 360/105 |
| 4,796,130 | 1/1989 | Shimanuki | 360/105 |
| 4,839,756 | 6/1989 | Chew et al. | 360/105 |
| 4,864,444 | 9/1989 | Liv et al. | 360/105 |
| 4,884,261 | 11/1989 | Dalziel | 360/105 |
| 4,933,785 | 6/1990 | Morehouse et al. | 360/78.04 |
| 4,988,134 | 1/1991 | Vidwans et al. | 292/DIG. 22 |
| 4,996,617 | 2/1991 | Yaeger et al. | 360/105 |
| 5,012,371 | 4/1991 | Pollard et al. | 360/105 |
| 5,023,736 | 6/1991 | Kelsic et al. | 360/105 |
| 5,036,416 | 7/1991 | Mastache | 360/105 |
| 5,134,608 | 7/1992 | Strickler et al. | 360/105 |
| 5,152,562 | 10/1992 | Stevenson et al. | 292/252 |
| 5,161,770 | 11/1992 | Morehouse et al. | 360/133 |
| 5,162,959 | 11/1992 | Arin et al. | 360/105 |
| 5,216,662 | 6/1993 | Stefansky et al. | 360/105 |

OTHER PUBLICATIONS

Quantum Corporation, "Technical Highlights: Go--Drive Series, Pro Drive Gen Series"; Sep. 1990; pp. 1-5.

Primary Examiner—Stuart S. Levy
Assistant Examiner—Jefferson Evans
Attorney, Agent, or Firm—Skjerven, Morrill, MacPherson, Franklin & Friel; David E. Steuber

[57] ABSTRACT

A rotary inertial latch is disclosed for maintaining the actuator of a disk drive in its proper position when the drive is not in operation. The inertial latch includes at least one inertial body which contacts a pivotable latch member, at least when the disk drive is subject to a shock force, to move the pivotable latch member to a closed position.

12 Claims, 25 Drawing Sheets

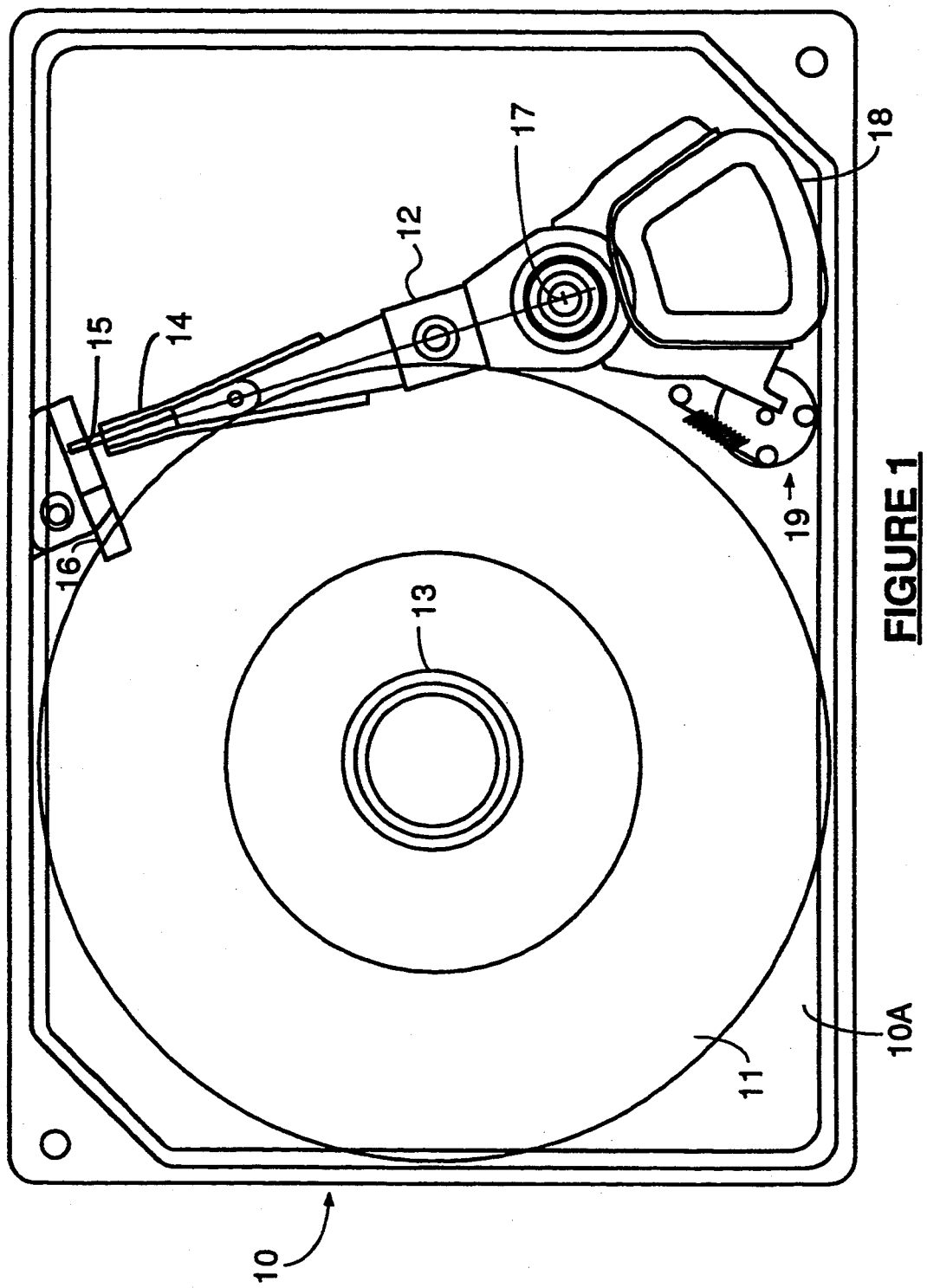

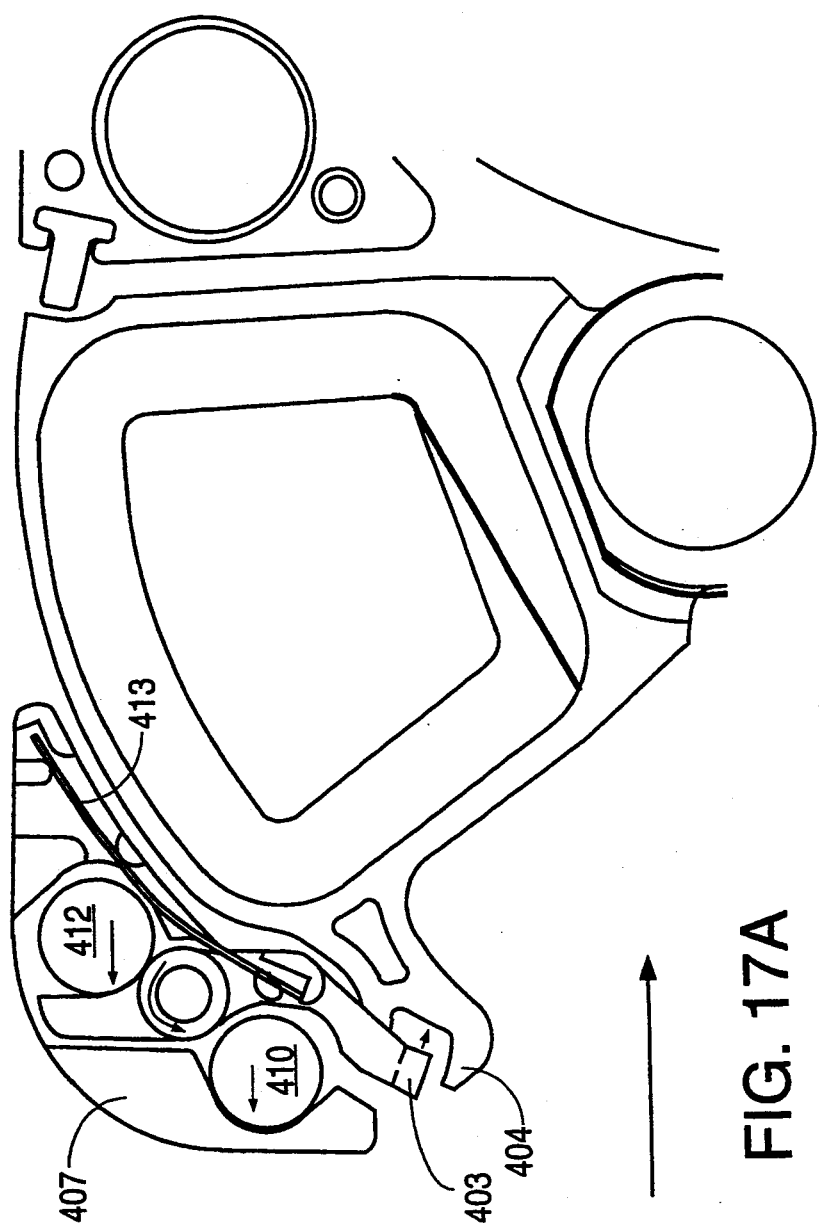

ROTARY INERTIAL LATCH FOR DISK DRIVE ACTUATOR

This application is a continuation-in-part of application Ser. No. 07/765,353, filed Sep. 25, 1991, now U.S. Pat. No. 5,246,486, which in turn is a continuation-in-part of application Ser. No. 07/629,929, filed Dec. 19, 1990, now U.S. Pat. No. 5,189,576.

FIELD OF THE INVENTION

This invention relates to the field of disk drives, and in particular to disk drives used in laptop, hand held or other small computers.

BACKGROUND OF THE INVENTION

In computer systems, information is frequently stored in a magnetic film on the surface of a hard or soft disk. The information is stored in concentric tracks in the magnetic film, and it is written to or read from the film by means of a magnetic head or transducer. When storing or retrieving data, the magnetic head rides on a thin laminar boundary layer of air over the rapidly rotating disk, thereby avoiding direct contact with the magnetic surface.

On most disk drives, the magnetic head or transducer is mounted near the end of a member commonly referred to as an actuator. Two configurations of actuators, linear and rotary, have been widely used. In the linear configuration, the actuator is mounted with the magnetic head pointing directly toward the center of the disk and the actuator moves linearly along a radial line to position the magnetic head at a desired position above the magnetic surface of the disk. In the rotary configuration, the actuator rotates about a pivot point near the circumference of the disk, with the magnetic head swinging so as to define an arc over the surface of the disk.

Two further categories of disk drives are defined by the position of the read/write head when the drive is not operating. In "dynamic loading" drives, the head is withdrawn to a position away from the disk (typically on a ramp), whereas in "contact start/stop" (CSS) drives, the head is moved to a "park" position, that is, a position on a nondata zone of the disk (typically near the center) which is reserved for take-offs and landings and resting when the CSS drive is not operating. When the drive is not operating, it is important that the head be restrained on its ramp or other restraining structure if the drive is a dynamic loading type, and that it be restrained in its "park" position on the surface of the disk if the drive is a CSS type. Any abnormal contact between the head and the disk may create a stiction or adhesion or may otherwise damage the head and/or the disk.

Several mechanisms have been proposed to lock the actuator in its proper position when the drive is not in operation. In some drives, the actuator becomes engaged to a passive magnetic or spring-loaded latch when the drive is turned off, the holding force of the latch being overcome by the actuator motor when the drive is turned on again. These mechanisms are vulnerable to becoming disengaged and releasing the actuator if the computer is subjected to a shock force, for example by being bumped or dropped, while not in operation.

Other protective mechanisms rely on a spring-loaded latch and solenoid, the solenoid allowing the spring-loaded latch to restrain the actuator when the power is off and being energized so as to release the actuator when the power is on. While such mechanisms do provide some measure of protection against shock forces when the drive is not operating, solenoid latches tend to be expensive and unreliable, and they consume power while the drive is operating. Moreover, since a very weak spring must be used to avoid the need for a large power-consuming solenoid, even a solenoid latch may be disengaged if the computer is subjected to a strong external shock force. Examples of such mechanisms are disclosed in U.S. Pat. No. 4,716,480, issued Dec. 29, 1987 to Wiens et al., and U.S. Pat. No. 4,725,907, issued Feb. 16, 1988 to Jue, both of which operate with linear rather than rotary actuators.

Rotary actuators are particularly vulnerable to rotational shocks and acceleration. Since a rotary actuator can be designed so that it is substantially balanced with respect to its pivot point, a purely translational shock will operate equally on both ends and will not cause the actuator to move with respect to the rest of the disk drive. Any small imbalances that are due to typical manufacturing variations will not normally create an inertial force large enough to overcome a passive latching mechanism. On the other hand, it is critical to provide protection against the inertial forces arising from rotational shocks, since these may easily cause the rotary actuator to swing about its pivot point, thereby bringing the magnetic head into unwanted contact with the disk. This need has become all the more pressing with the advent of laptop and even smaller computers. These computers operate in a particularly severe environment, and they may readily be subjected to strong rotational forces as they are jarred, bumped and sometimes dropped when being carried about or otherwise not in use.

SUMMARY OF THE INVENTION

In a inertial latch according to this invention, an inertial body is mounted on a shaft which is substantially parallel to the axis about which a rotary disk drive actuator pivots. The inertial body includes a pin or other member which is capable of engaging a corresponding finger or other member on the actuator so as to prevent the actuator from rotating. The inertial body is free to rotate about its shaft, but a small spring biases it in an unlocked position, with the corresponding locking members of the inertial member and actuator held apart, when the computer is not being subjected to rotational forces.

On the other hand, when the computer is subjected to a strong rotational force or shock, the main body of the disk drive accelerates angularly in the direction of the force. The inertial body is free to rotate, however, and since its moment of inertia is sufficient to overcome the force of the spring, it does not accelerate with the rest of the disk drive. The result is relative rotation between the inertial body and disk drive which, assuming that the shock is in a direction which would tend to swing the head toward the disk, brings the corresponding locking members of the inertial body and actuator into engagement and thereby prevents the actuator from angular movement with respect to the remainder of the disk drive.

In an alternative embodiment according to this invention, two inertial bodies are positioned around the pivot point of a latch member. Each of the inertial bodies is positioned in a cavity between a surface of the latch member and a generally opposing surface of a base of the latch. The opposing surfaces are shaped such that when the disk drive is subjected to a shock force in either direction along a line generally connecting the two inertial bodies, each of the inertial bodies, through its contact with the latch member, exerts a force which tends to bring the latch member into engagement with the actuator. When the disk drive is subjected to a shock force in a direction perpendicular to the above-mentioned line, one of the inertial bodies exerts a force on the latch member bringing it into engagement with the actuator. This embodiment is particularly applicable in the case of extremely small disk drives, where space constraints may limit the rotary inertia-to-mass ratio of the latch. The rotary inertia-to-mass ratio of the latch is a measure of the ability of the latch to trigger in the presence of a combined linear-rotational shock force.

The principles of this invention are applicable to any situation in which it is desired to trigger a rotary member to a predetermined position when the rotary member is subjected to a shock force.

An inertial latch in accordance with the invention is simple, reliable and consumes no electrical power. This makes it particularly suitable for miniature computers, which are often battery operated.

While an inertial latch is described herein in conjunction with a disk which stores information in a magnetic medium, the principles of this invention are equally applicable to disk drives which use other types of storage disks, for example, magneto-optic and conventional phonographic disks. Moreover, the principles of this invention are applicable to CSS disk drives and "dynamic loading" drives alike.

BRIEF DESCRIPTION OF THE DRAWINGS

FIG. 1 is a general overhead view of a dynamic loading disk drive, showing the relative positions of a rotary actuator and an inertial latch in accordance with this invention.

FIGS. 17A–17D illustrate the operation of the fourth embodiment in the presence of shock forces from different directions.

DETAILED DESCRIPTION OF THE INVENTION

Figure 3:
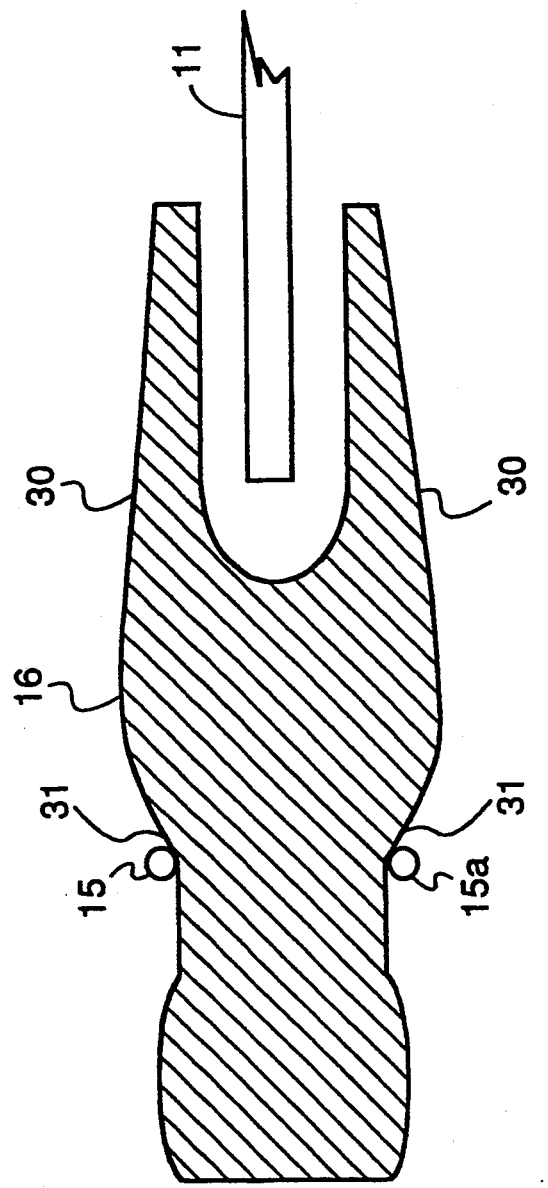
FIG. 3 is a side view of the ramp and related elements shown in FIG. 1.

FIG. 1 shows a general overhead view of a dynamic loading disk drive 10, which includes a drive body 10A, a disk 11 and a rotary actuator 12. Disk 11 is driven by and rotates around a combined spindle and motor 13. At one end of actuator 12 are mounted a magnetic head 14 and a cam follower 15, the latter of which rides on a ramp 16. FIG. 3 shows the structure of cam follower 15 and ramp 16 in more detail.

Actuator 12 rotates about pivot shaft 17 and is driven by an actuator coil 18 in conjunction with a magnet assembly (not shown) which together make up a voice coil motor which swivels actuator 12 so as to position magnetic head 14 over a desired location on disk 11. Positioned adjacent an end of actuator 12 is an inertial latch 19, which will now be described in greater detail with reference to FIG. 2A.

Figure 2A:
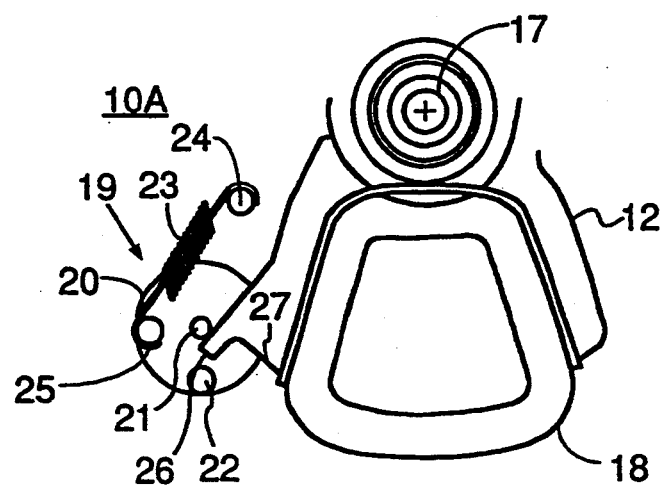
FIGS. 2A and 2B show a portion of a rotary actuator and an inertial latch in accordance with the invention, with the latch in unlocked and locked positions, respectively.

FIG. 2A shows inertial latch 19 when it is in an open or unlocked condition. One end of a shaft 21 is journaled into an inertial body 20 so as to allow inertial body 20 to rotate in either direction. The other end of shaft 21 is attached to body 10A. Inertial body 20 is shown as being circular in FIG. 2A, but this is not in any respect intended to be limiting. Inertial body 20 may be configured in virtually any shape, since its shape is not critical to its operation. A locking pin 22 is attached to the surface of inertial body 20. When inertial latch 19 is in its unlocked condition, as shown in FIG. 2A, the angular position of locking pin 22 about shaft 21 is determined by a coil spring 23, which extends between a pin 24 joined to drive body 10A and a pin 25 joined to inertial body 20. A finger 26 protrudes from actuator 12, adjacent to which is a striking surface 27, which is aligned to be in the path of pin 22 as it rotates in a counterclockwise direction.

When drive 10 is not operative, magnetic head 14 is normally restrained by the structure shown in FIG. 3, which shows ramp 16 viewed from the side away from actuator 12. This structure is described in greater detail in copending and commonly assigned U.S. patent application Ser. No. 07/629,948, of J. Morehouse et al. filed on Dec. 19, 1990, now abandoned, and entitled: "Miniature Hard Disk Drive For Portable Computer" which is incorporated herein by reference in its entirety. As shown in FIG. 3, cam follower 15 is mirrored by a similar cam follower 15a beneath ramp 16. Cam followers 15 and 15a encounter inclines 30 on ramp 16 when they swing away from disk 11. As cam followers 15 and 15a slide further leftward along inclines 30, magnetic head 14 is lifted away from the surface of disk 11, until cam followers 15 and 15a reach locking positions 31. A stop (not shown) prevents cam followers 15 and 15a from moving substantially beyond locking positions 31.

Figure 2B:
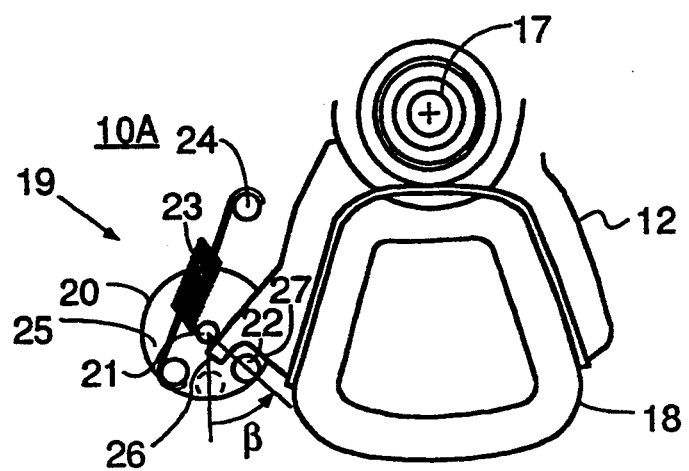

The operation of inertial latch 19 will now be described. When the disk drive is turned off, cam followers 15 and 15a normally rest in locking positions 31, and inertial latch 19 is in the unlocked condition shown in FIG. 2A. The frictional force between cam followers 15 and 15a and ramp 16 is enough to restrain actuator 12 from swinging as a result of a minor rotational shock. If disk drive 10 incurs a strong clockwise rotational force, however, actuator 12 will tend to rotate in a counterclockwise direction with respect to body 10A, potentially allowing magnetic head 14 to make contact with disk 11. In this case, the inertia of inertial body 20 will overcome the force of spring 23, and inertial body 20 will also rotate in a counterclockwise direction with respect to body 10A. Pin 22 will therefore rotate through an angle $\beta$ as shown in FIG. 2B until it strikes surface 27. In this position, pin 22 blocks any appreciable movement of arm 26 to the right and thereby prevents actuator 12 from rotating in a counterclockwise direction. Following the shock, spring 23 will urge inertial body 20 back to the unlocked position shown in FIG. 2A, and cam followers 15 and 15a will return to locking positions 31.

If disk drive 10 incurs a strong counterclockwise force, no problem will arise since actuator 12 will tend to rotate clockwise with respect to body 10A until it reaches the stop (not shown), after which cam followers 15 and 15a will return to locking positions 31.

It will be apparent that the effective operation of inertial latch 19 depends in part on the correct adjustment of the torque impressed by spring 23 on inertial body 20 as compared with the moment of inertia of inertial body 20. To assure that inertial latch responds to a rotational force which would cause actuator 12 to pivot, the following condition should be satisfied:

$$\frac{T_{spring}}{J_{latch}} < \frac{T_{ramp}}{J_{actuator}}$$

where $T_{spring}$ is the torque applied by coil spring 23, $J_{latch}$ is rotational inertia of inertial latch 19, $T_{ramp}$ is the torque applied to actuator 12 by the resistance between cam followers 15 and 15a and ramp 15, and $J_{actuator}$ is the rotational inertia of actuator 12.

In practice, it has been found that spring 23 should exert just enough force to maintain latch 19 in an unlocked condition when disk drive 10 is not being exposed to significant rotational forces.

It should be stressed that the configuration shown in FIGS. 2A and 2B, including inertial body 20, pin 22 and finger 26 is illustrative only. As noted above, inertial body 20 need not be round and can in fact assume a wide variety of shapes and sizes. Pin 22 and finger 25 may be replaced by any two members or devices which are capable of engaging or interlocking in any way upon the rotation of inertial body 20, so as to prevent actuator 12 from rotating in a manner to threaten contact between magnetic head 14 and disk 11. While inertial body 20 is shown as being positioned under actuator 12, this relationship likewise need not be adhered to. Inertial member 20 could be below actuator 12, above actuator 12, laterally adjacent actuator 12, or any combination of the foregoing. Moreover, inertial latch 19 need not be located at the position on housing 10A shown in FIG. 1 and FIGS. 2A and 2B. It can be located at a position adjacent any portion or surface of actuator 12. The moment of force applied by inertial latch 19 against the unwanted rotation of actuator 12 will, of course, be greater to the extent that inertial latch 19 is distanced from pivot 17.

Spring 23 may likewise be replaced by a variety of mechanisms that will maintain inertial latch 19 in an unlocked condition and prevent it from locking inadvertently when disk drive 10 is not being subjected to a rotational force. For example, an elastic or elastomeric device could be used in place of spring 23. A torsional spring could be placed around shaft 21, or spring 23 and shaft 21 could be integrated into a flexural spring pivot. A passive magnet might also be used to hold inertial member 20 in an unlocked position in normal situations.

Figure 4:
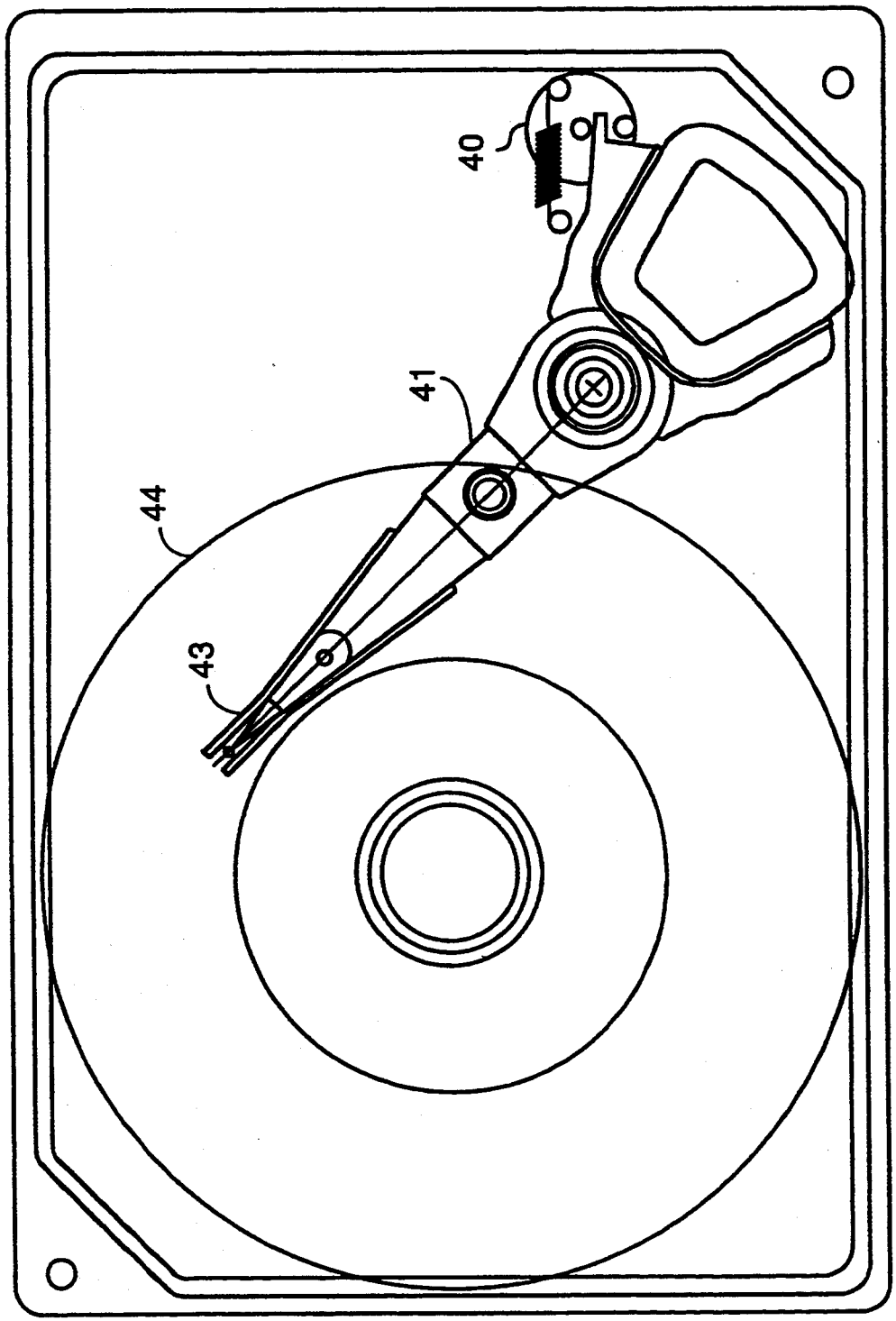
FIG. 4 is an overhead view of a contact start/stop (CSS) disk drive having an inertial latch in accordance with the invention.

An inertial latch according to this invention may also be used with a contact start/stop disk drive. Such an embodiment is shown in FIG. 4, where an inertial latch 40 is configured so as to prevent clockwise rotation of an actuator 41 with respect to the remainder of a contact start/stop disk drive 42. A head 43 is shown in its "parking" position on an inner portion of a disk 44 while disk drive 42 is not in operation. FIG. 4 shows inertial latch 40 in a locked condition, preventing head 43 from sliding across disk 44 in a clockwise direction when drive 42 encounters a counterclockwise rotational force.

Figure 5:
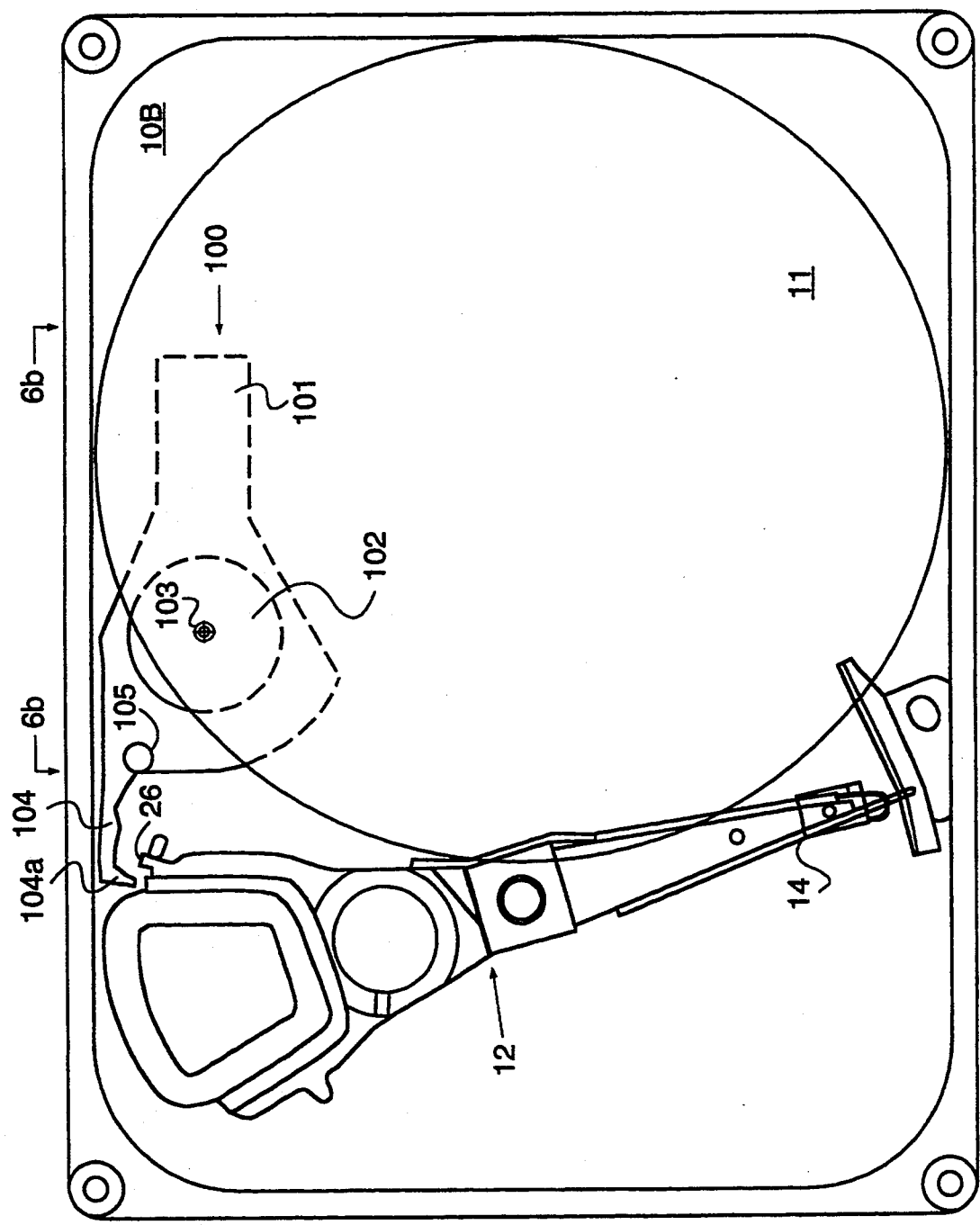
FIG. 5 illustrates a second embodiment of the invention.

A second embodiment in accordance with the invention is shown in FIG. 5. Inertial latch 100 includes an inertial body 101 and a sleeve 102. A shaft 103 is journaled into sleeve 102 so as to allow inertial latch 100 to rotate in either direction. The other end of shaft 103 is press fitted into body 10B. Shaft 103 may also be screwed or bonded into body 10B. Inertial latch 100 is retained on shaft 103 by means of a retaining ring (e.g., an "E"-clip) (not shown).

Inertial body 101 is formed at one end in the shape of a pawl 104 which terminates in a hook 104a, and shaft 103 is positioned on body 10B so that hook 104a is able to engage finger 26 of actuator 12. A pin 105 extends upward from the top surface of inertial body 101. While inertial body 101 and sleeve 102 are shown as separate components, they could be combined. As indicated by the hatched lines, inertial latch 100 is mounted beneath disk 11.

Sleeve 102 is preferably made of Teflon TM filled polycarbonate and is press-fitted into inertial body 101. Inertial body 101 is manufactured of bronze (85% by mass) filled Nylon II TM.

Figure 6A:
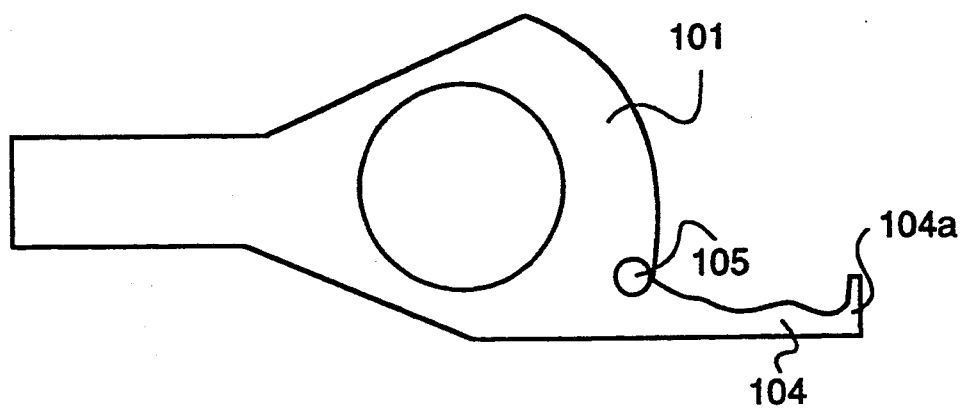
FIGS. 6A and 6B illustrate top and side elevational views, respectively, of the inertial body in the embodiment of FIG. 5.
Figure 6B:
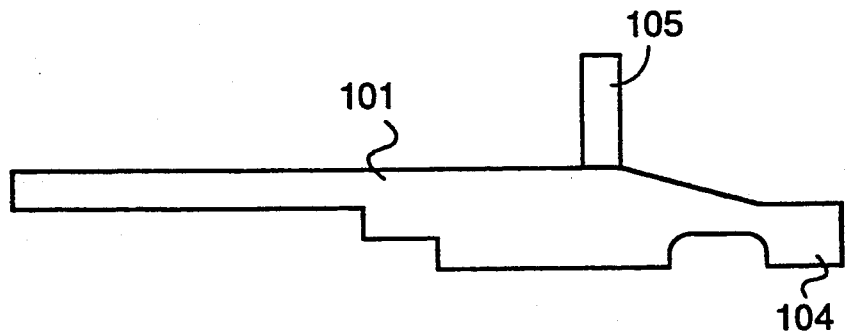

FIG. 6A shows a top view of inertial body 101, and FIG. 6B shows a side elevational view of inertial body 101 taken from the direction 6B shown in FIG. 5.

Figure 7:
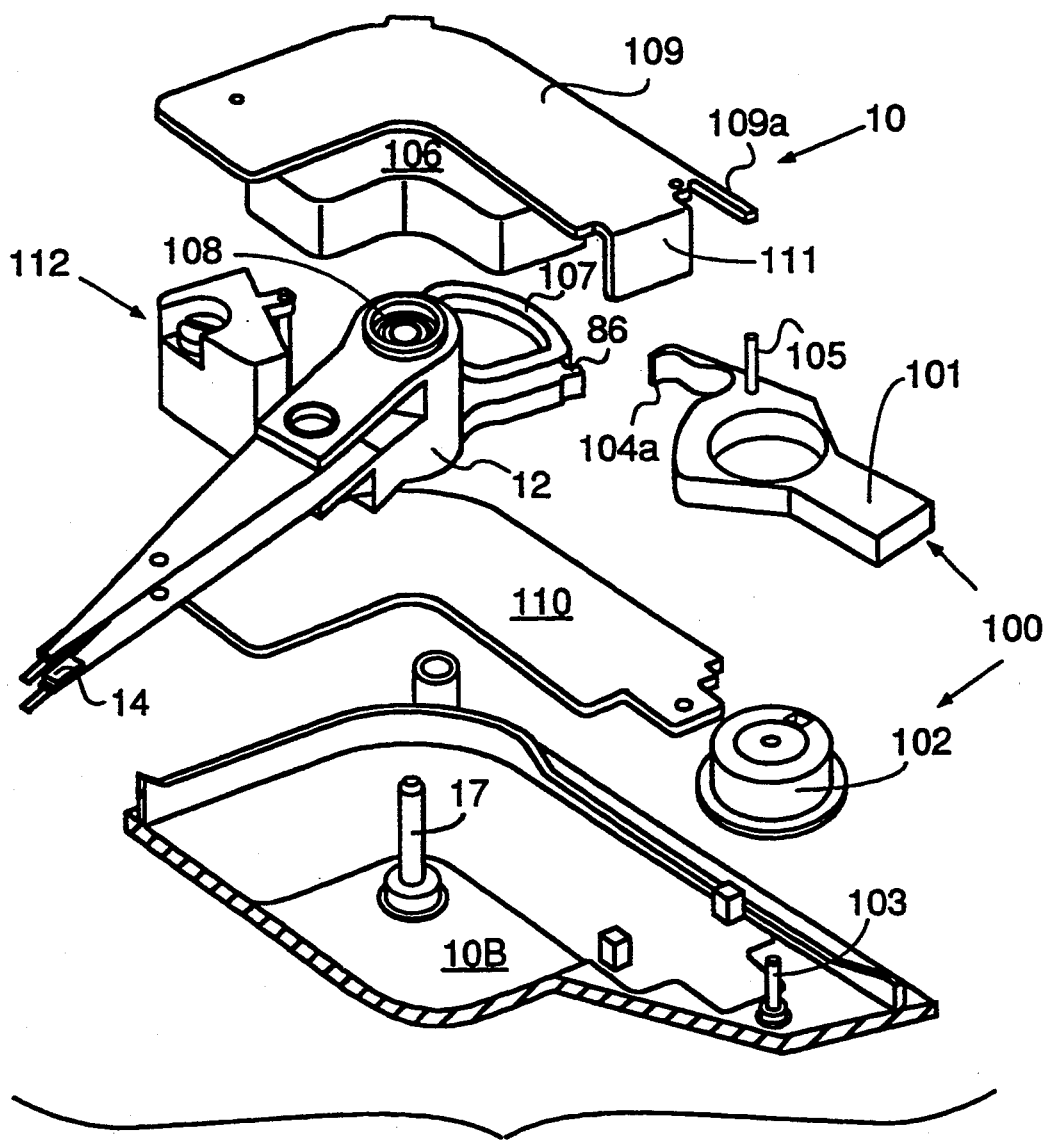
FIG. 7 is an exploded view showing how the inertial latch of FIG. 5 is mounted on a disk drive.

FIG. 7 is an exploded view of the corner portion of disk drive 10 where rotary actuator 12 and inertial latch 100 are positioned. Rotary actuator 12 is of the moving coil type, that is, a magnet 106 is maintained in a stationary position and the movable portion of the actuator 12 includes a coil 107. Included in actuator 12 is a bearing assembly 108 for rotatably supporting actuator 12 about pivot shaft 17 which is connected to body 10B. The flux field is established through actuator coil 107 through the use of magnet 106, which is supported on a top plate 109 to position the magnet 106 above the top surface of actuator 12. A lower plate 110 of the magnet assembly provides the lower portion of the flux path in conjunction with the down turned portion 111 of top plate 109. A tab 109a of top plate 109 serves as a stop for pin 105, thereby preventing inertial latch 100 from rotating too far in a clockwise direction. Inner crash stop assembly 112 is positioned between top plate 109 and lower plate 110. Inner crash stop assembly 112 prevents the rotation of actuator 12 beyond a predetermined inner travel to prevent the read/write transducer heads from leaving the surface of the disk or hitting other HDA components.

Figure 8B:
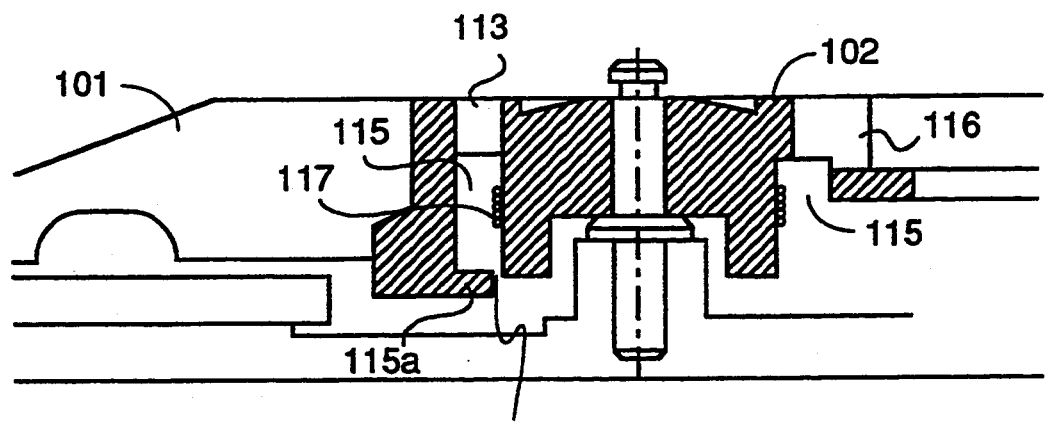
FIGS. 8A and 8B are top and side elevational views of the sleeve in the inertial latch of FIG. 5.
Figure 8A:
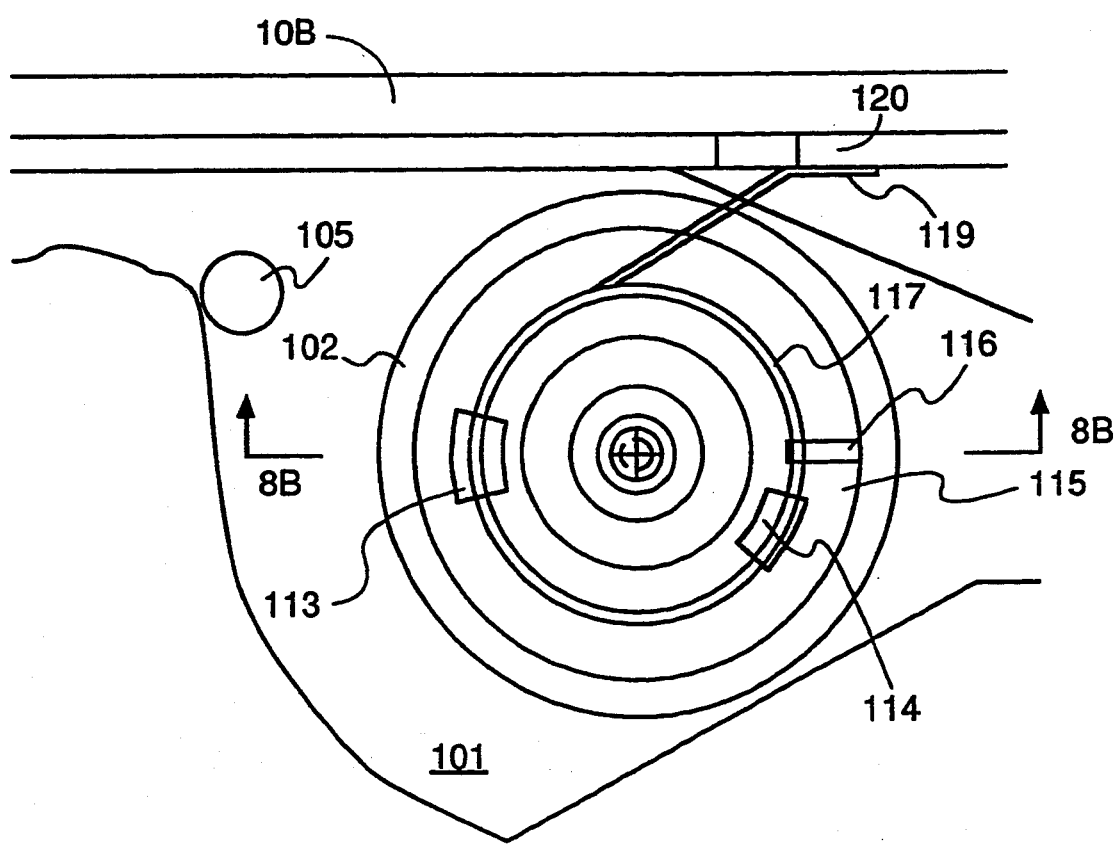

FIGS. 8A and 8B illustrate top and cross-sectional views, respectively, of sleeve 102. FIG. 8B is taken through section 8B as indicated in FIG. 8A.

Figure 9A:
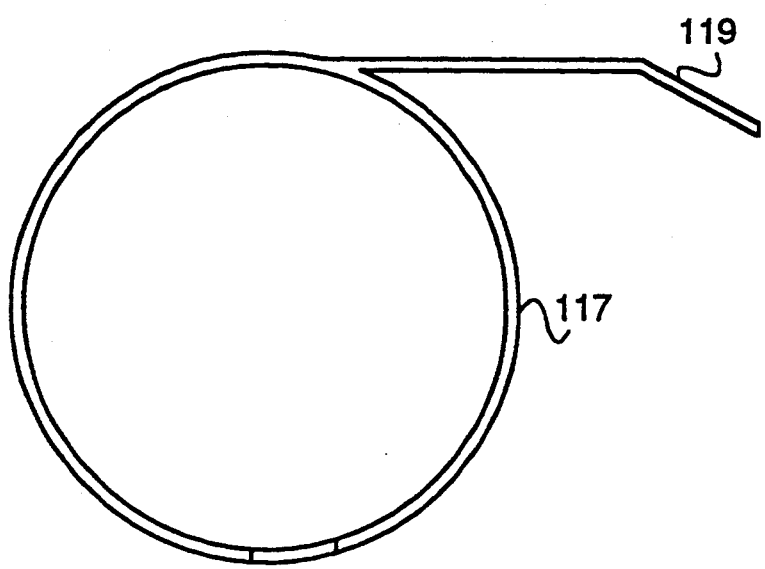
FIGS. 9A and 9B are top and side elevational views of the spring in the inertial latch of FIG. 5.
Figure 9B:
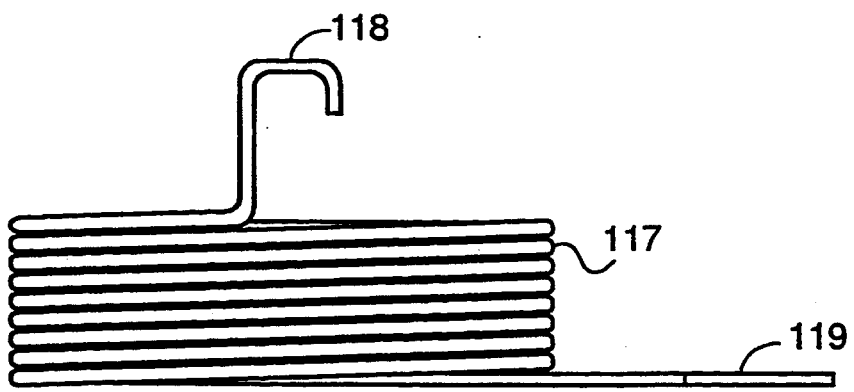

Sleeve 102 has formed in it two vertical channels 113 and 114, respectively, which extend from the top surface of sleeve 102 to a circular channel 115 which is formed in the interior of sleeve 102. Sleeve 102 also has a radial slot 116 formed in its top surface. A circular spring 117 is inserted into circular channel 115. Circular spring 117, as shown in FIGS. 9A and 9B, has at one end a hook 118 and at the other end a lateral arm 119.

When circular spring 117 is inserted into circular channel 115, hook 118 extends up through vertical channel 114 and the end of hook 118 is placed in radial slot 116, thereby securing circular spring 117 within sleeve 102. A finger 115a defines a narrow gap 115b and keeps spring 117 from slipping out of channel 115.

As shown in FIG. 8A, lateral arm 119 engages a wall 120 of body 10B. Thus, as inertial latch 100 is rotated in a counterclockwise direction, circular spring 117 is placed in tension and exerts a clockwise torque on inertial latch 100.

When disk drive 10 incurs a clockwise rotational shock, in the manner described above the rotational inertia of inertial latch 100 overcomes the torque of circular spring 117 and causes inertial latch 100 to rotate in a counterclockwise direction with respect to body 10B. Hook 104a therefore engages finger 26 of actuator 12 and prevents actuator 12 from rotating so as to bring magnetic head 14 into contact with disk 11. When the shock has passed, circular spring 117 takes over and brings inertial latch 100 back to its normal position, where pin 105 engages tab 109a (see FIG. 7).

Figure 10:
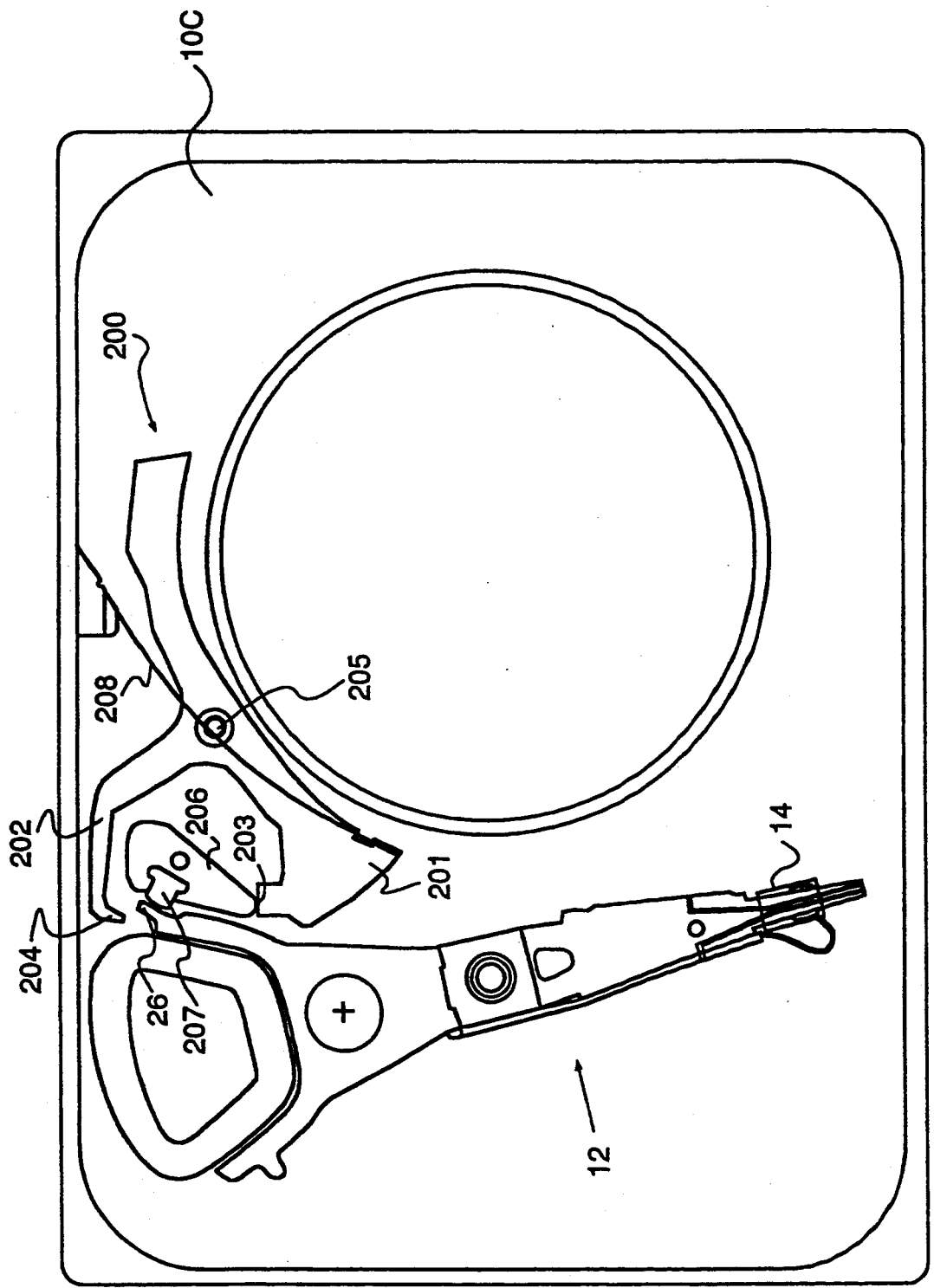
FIG. 10 illustrates a third embodiment of the invention.

A third embodiment in accordance with the invention is shown in FIG. 10. Inertial latch 200 has an arm 201 and a pawl 202. Arm 201 ends in a contact surface 203, and pawl 202 ends in a hook 204. Inertial latch 200 is rotatably mounted on a shaft 205, which is pressed into body 10C. Shaft 205 may also be screwed or bonded into body 10C. An outer crash stop block 206 is pinned to body 10C in a position between arm 201 and pawl 202. Outer crash stop block 206 has attached to it an outer crash stop 207, which is positioned opposite finger 26 so as to prevent actuator 12 from rotating too far in a clockwise direction.

Figure 11A:
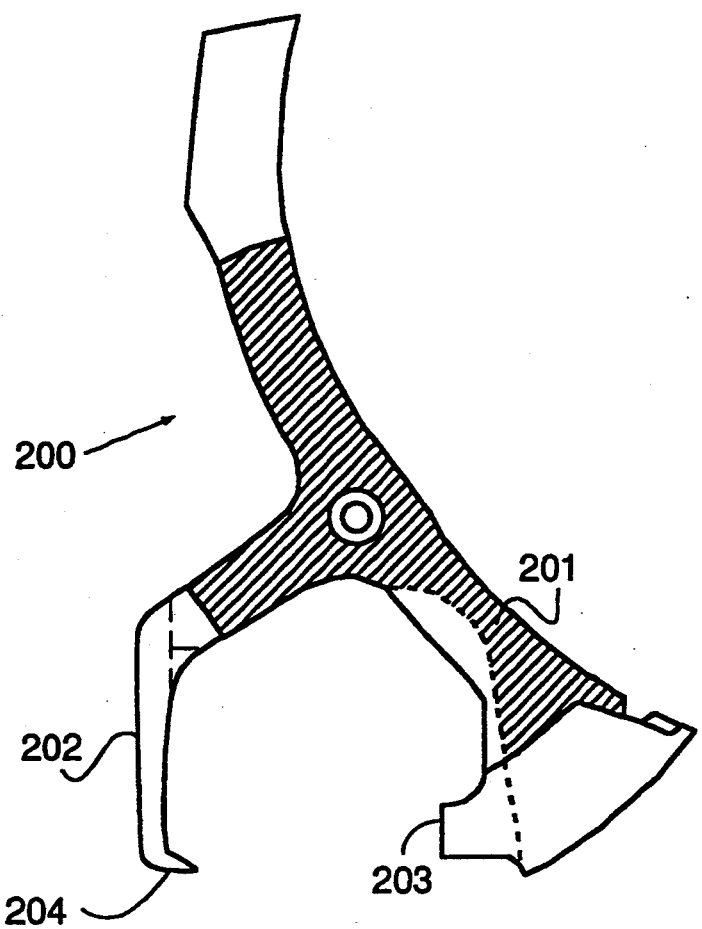
FIGS. 11A and 11B illustrate top and side elevational views, respectively, of the inertial latch of FIG. 10.
Figure 11B:
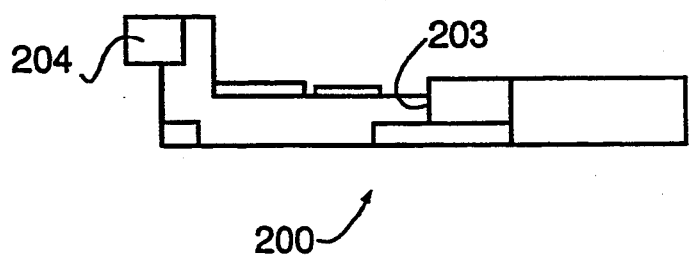

FIGS. 11A and 11B show top and side elevational views, respectively, of inertial latch 200. To maximize the rotational inertia of inertial latch 200 while minimizing its total mass, the central area of inertial latch 200 (shown by the cross hatching in FIG. 11A) has a reduced thickness as compared with the outer areas.

Figure 12:
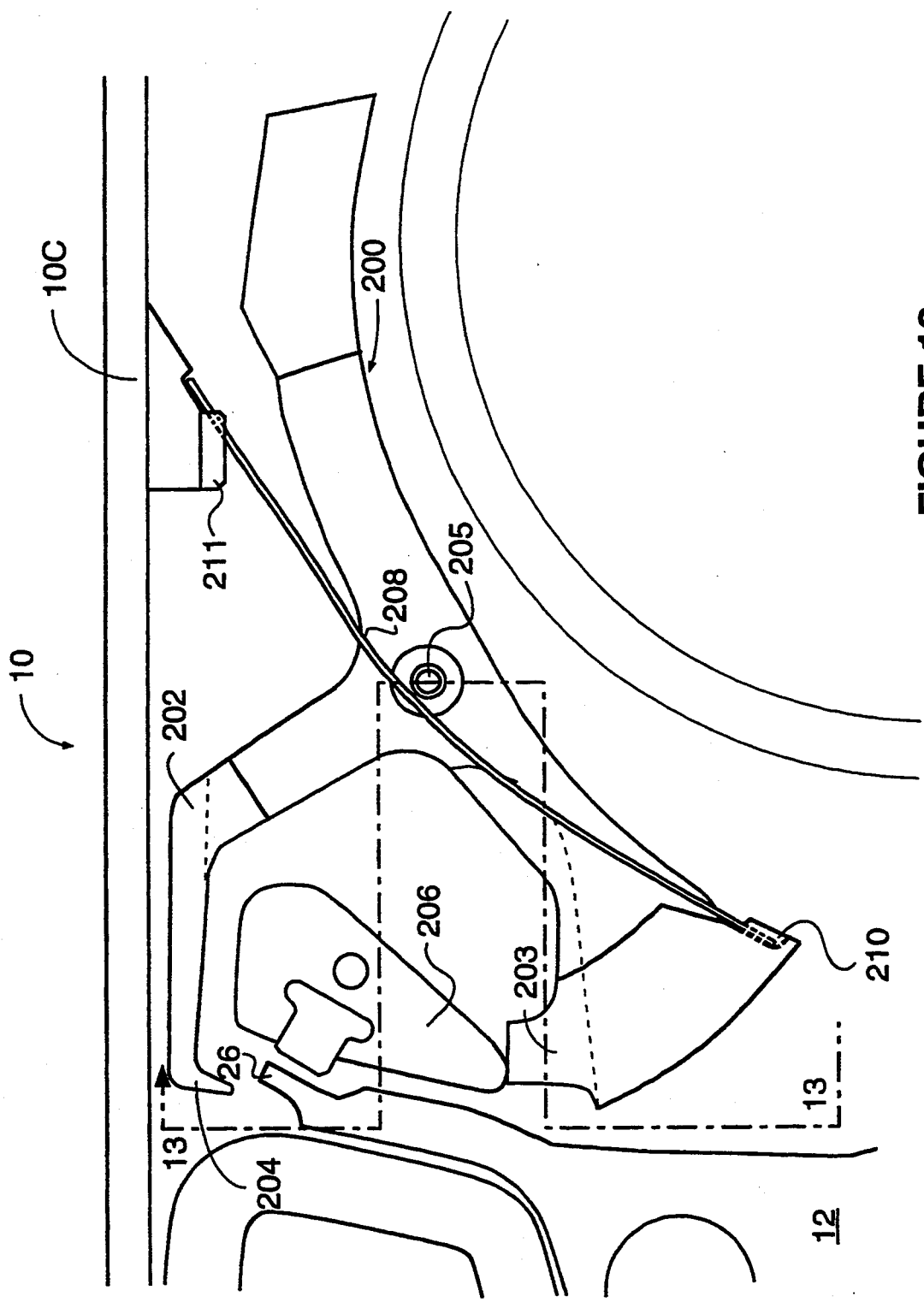
FIG. 12 is a detailed view showing how the inertial latch of FIG. 10 is mounted in a disk drive.
Figure 13:
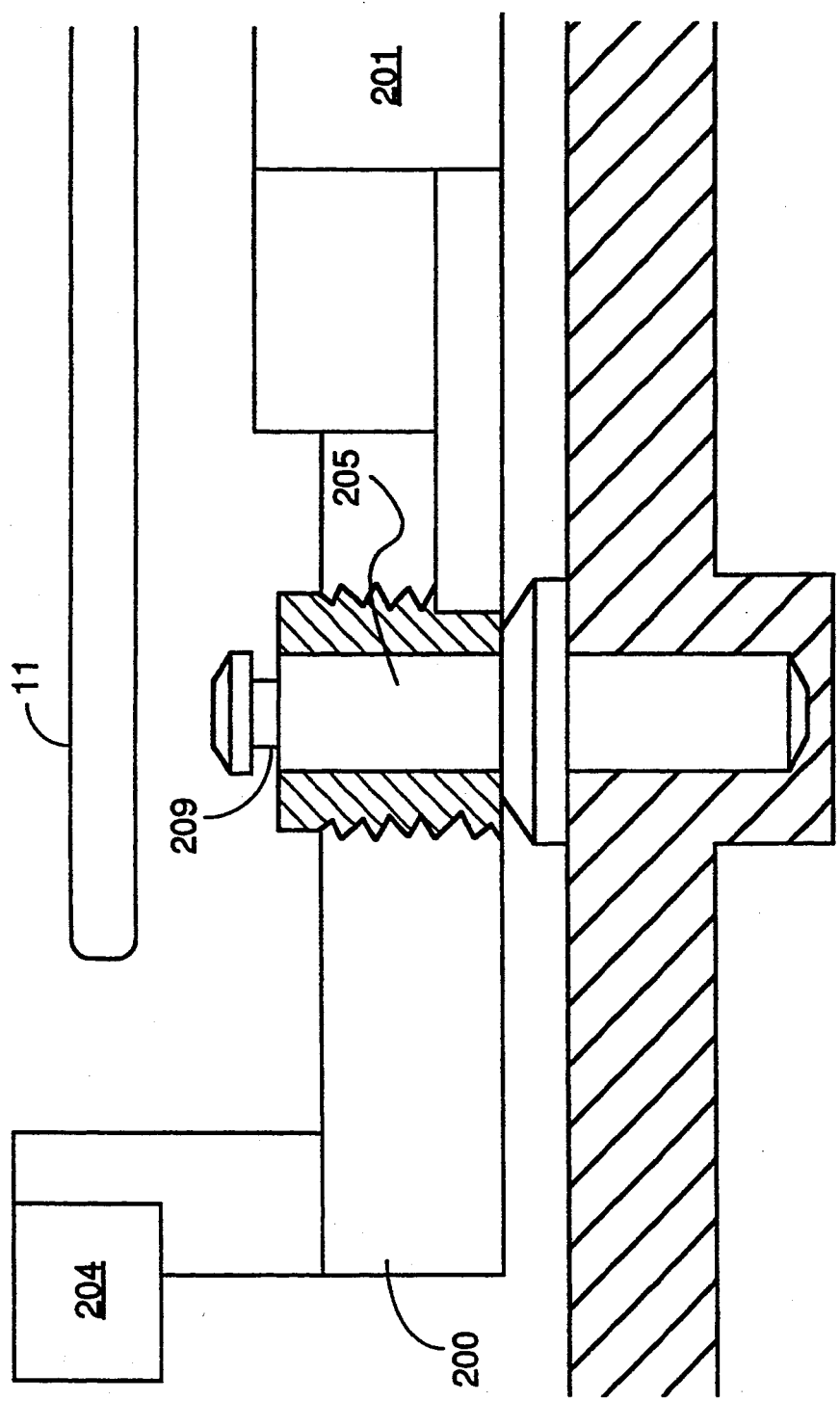
FIG. 13 is a detailed elevational view of the inertial latch of FIG. 10.

FIG. 12 illustrates a detailed top view of inertial latch 200 as mounted. A whisker spring 208 is placed on top of inertial latch 200. In the embodiment shown, whisker spring 208 has a circular cross section 0.005 inches in diameter, but it need not have a circular cross section. A leaf spring may be substituted for whisker spring 208. Whisker spring 208 fits into a groove 209 near the top of shaft 205. This is shown in FIG. 13, which is a side elevational view of inertial latch 200 taken through cross section 13 shown in FIG. 12. One end of whisker spring 208 is fitted into a cored area 210 in inertial latch 200. The other end of whisker spring 208 is inserted into a slot 211 of which is machined into body 10C. The relative positions of cored area 210, shaft 205 and slot 211 are arranged such that whisker spring is pretensioned and urges inertial latch 200 in a clockwise direction, bringing contact surface 203 into contact with outer crash stop block 206. The seating of whisker spring 208 in groove 209 retains inertial latch 200 on shaft 205. Inertial latch 200 may also be retained on shaft 205 by means of a retaining ring (e.g., an "E"-clip).

Figure 14:
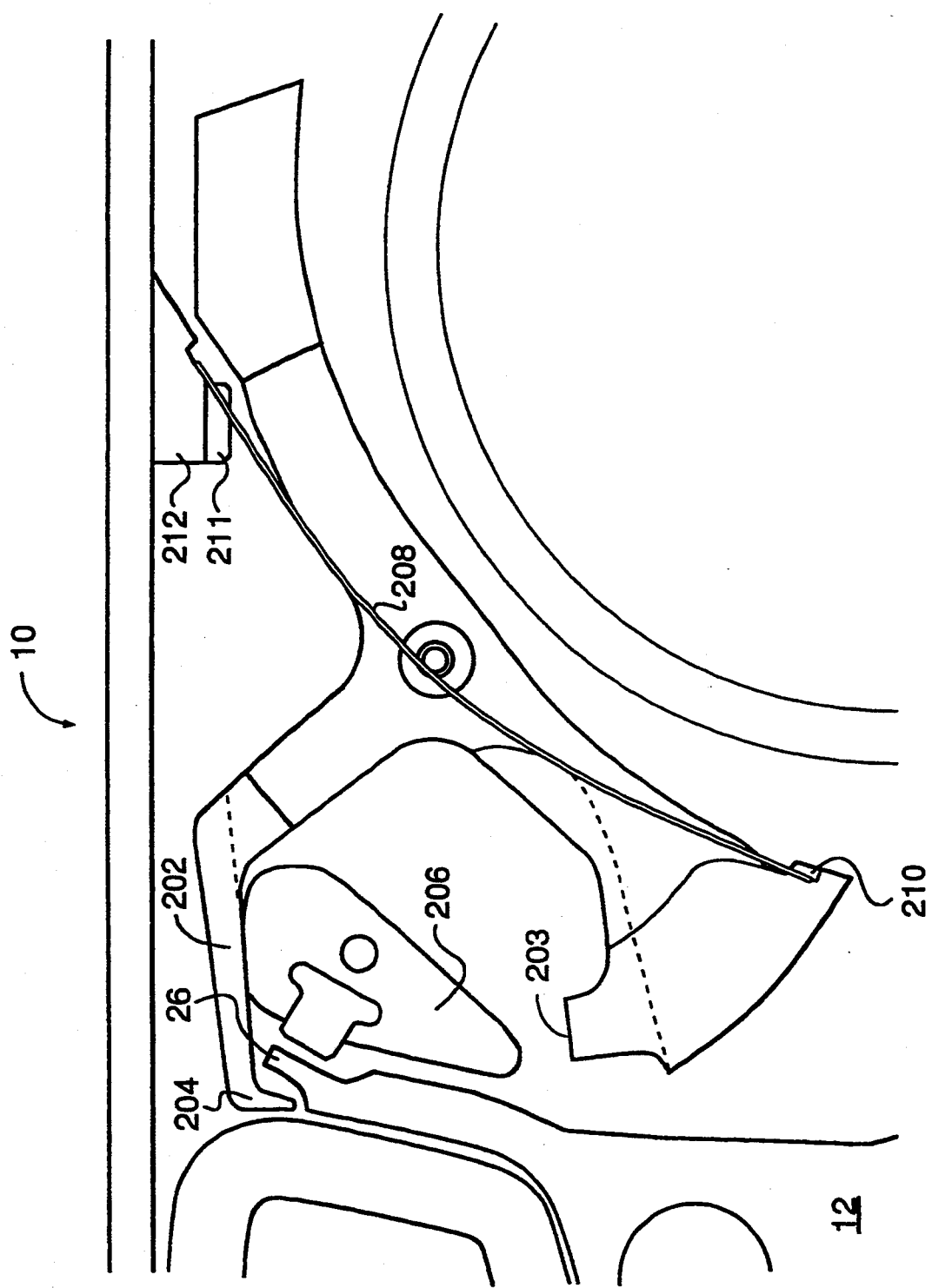
FIG. 14 illustrates the inertial latch of FIG. 10 in a locked position.

Inertial latch 200 is normally in the position shown in FIG. 12. When disk drive 10 experiences a clockwise rotational shock, inertial latch 200 rotates in a counterclockwise direction until the inner edge of pawl 202 comes into contact with a surface of outer crash stop block 206 (see FIG. 14). In this position hook 204 will engage finger 26 so as to prevent actuator 12 from rotating. Once the shock has passed, whisker spring 208 will urge inertial latch 200 towards its normal position, where surface 203 makes contact with outer crash stop block 206. The placement of whisker spring 208 on top of inertial latch 200 minimizes friction and thereby maximizes the response speed of inertial latch 200 to a rotational shock.

Figure 15:
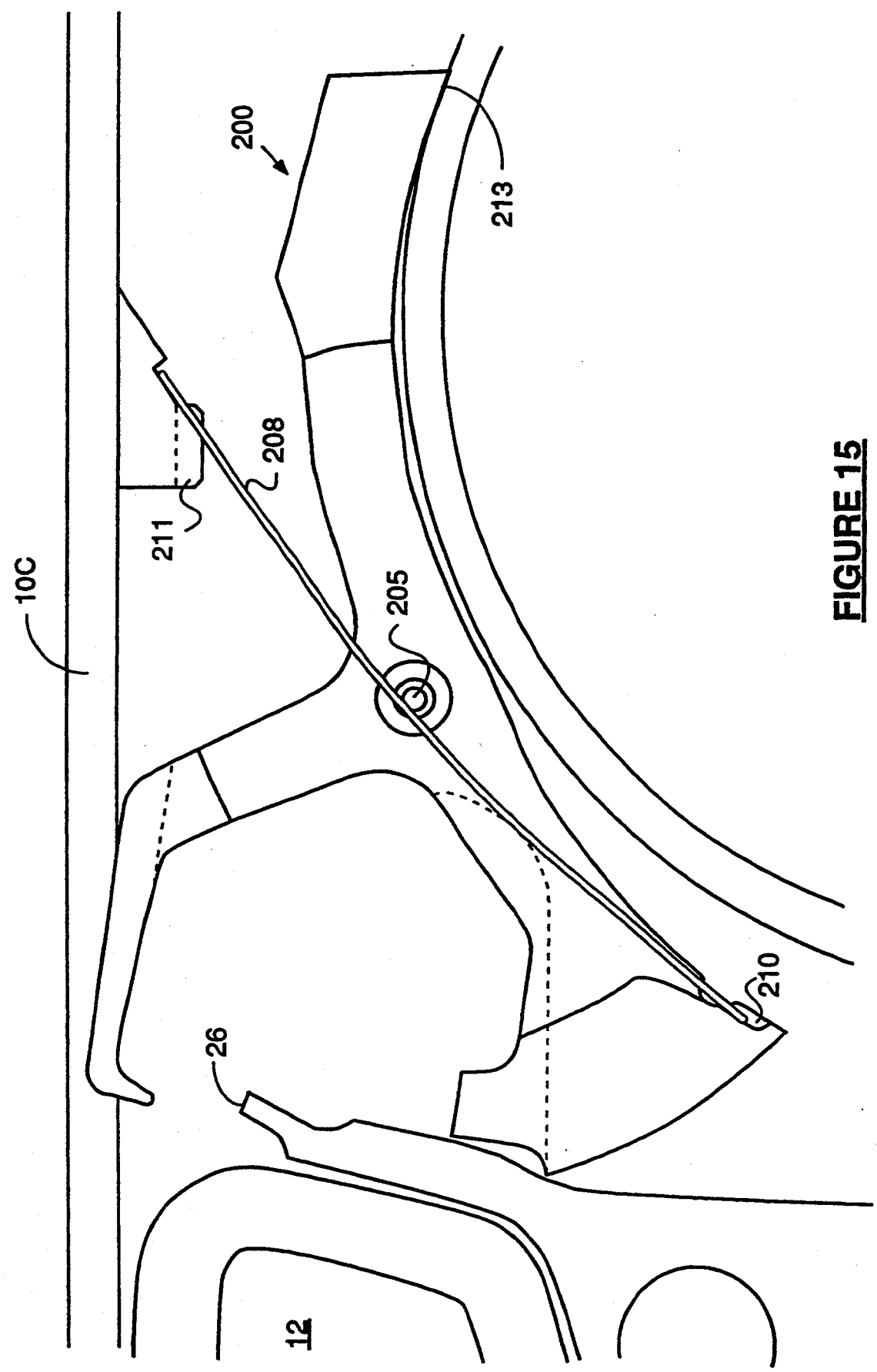
FIG. 15 illustrates the manner of mounting the inertial latch of FIG. 10.

The ease of assembling this embodiment makes it particularly attractive. As shown in FIG. 15, inertial latch 200 is simply fitted onto shaft 205 and whisker spring 208 is fitted into cored area 210, groove 209 and slot 211. Inertial latch 200 is preferably installed before outer crash stop block 206, and a surface 213 of body 10C acts as a stop for inertial latch 200 during installation. Installing inertial latch 200 in this sequence may make it easier to install actuator 12.

The rotary inertia-to-mass ratio of the inertial body is a measure of the ability of the inertial body to respond to a combined linear-rotational force. The ability of the latch to respond to a rotational force is measured by its rotary inertia, and the opposing frictional torque between the supporting shaft and the inertia body is measured by its mass. Thus, the overall effectiveness of the latch is proportional to its rotary inertia and inversely proportional to its mass.

These factors can become very significant in extremely small disk drives. For example, in a 1.8 inch drive with the inertial body mounted on a sleeve bearing, the rotary inertia-to-mass ratio has a limit of approximately 50 to 100 gm-mm$^2$/gm. Such a latch may fail to engage at linear acceleration levels as low as 300 g's. This problem can be alleviated by using ball or jeweled bearings at the pivot point, but this significantly increases the cost of the unit and requires more packaging space.

Moreover, in such small disk drives the static balance of the inertial body about its pivot point becomes very critical. Any static imbalance may create a torque on the inertial body at high levels of linear acceleration, and if this torque is directed against the operation of the inertial body the latch may fail.

Even achieving a rotary inertia-to-mass ratio of 50 to 100 gm-mm$^2$/gm may present problems in the case of small disk drives. The inertial body may have to be located below or (in multi-disk drives) between the recording disks to maximize its rotary inertia while maintaining its center of gravity at the pivot point. In this configuration, the inertial body may impact the disk surface in conditions of high shock forces. This may cause reliability problems. Moreover, installing and reworking the disks becomes more difficult when the inertial body is positioned between the disks in a multi-disk drive. In addition, there is an increased risk of damaging the disks during the installation or removal of the inertial latch.

Figure 16:
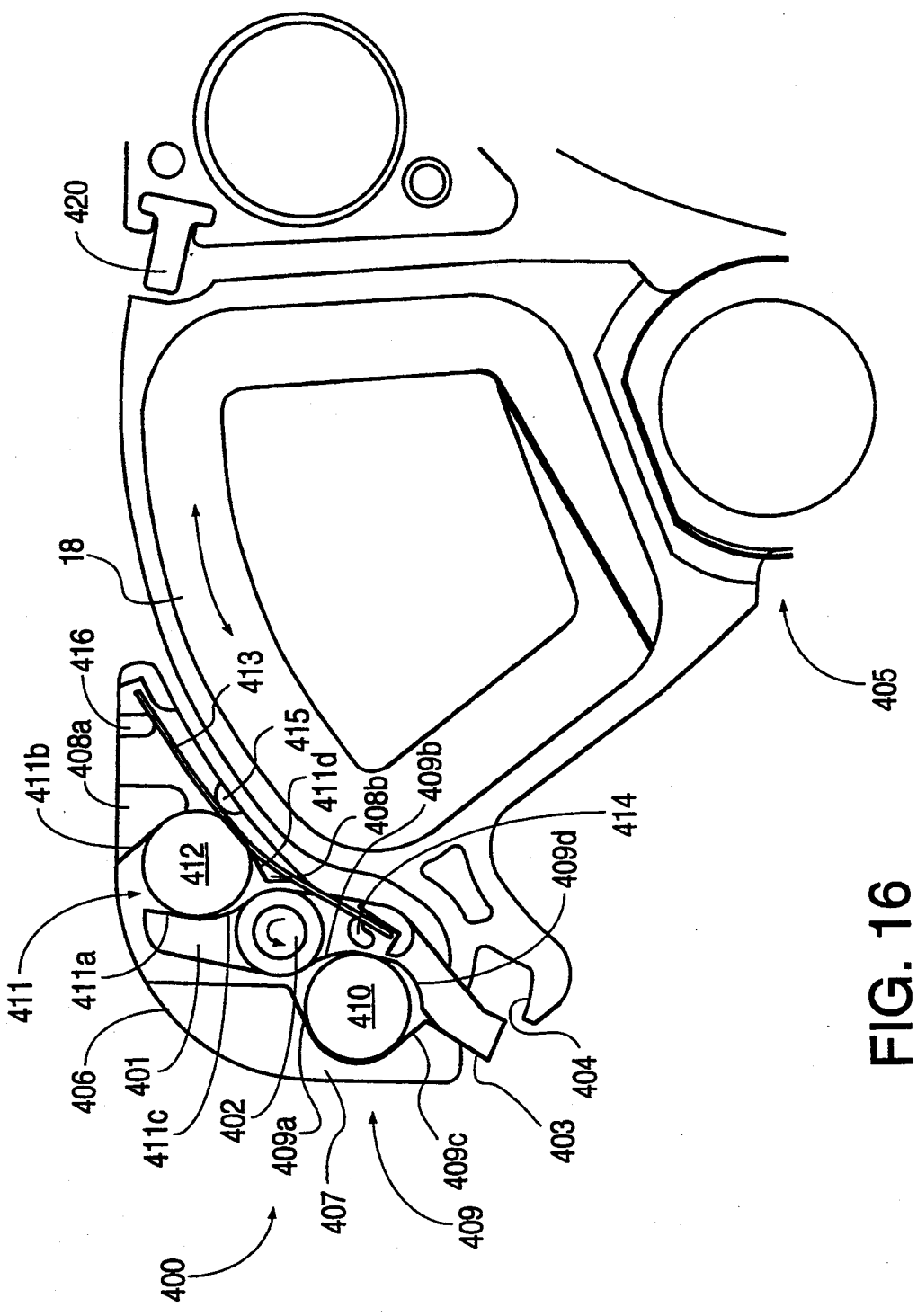
FIG. 16 illustrates a fourth embodiment of the invention.

These problems are overcome in an inertial latch 400, which is illustrated in FIG. 16. Inertial latch 400 includes a rotary latch member 401 which pivots about a shaft 402. A downward projecting tab 403 is formed at one end of latch member 401. As latch member 401 pivots about shaft 402, tab 403 engages a catch 404 which is formed on one side of an actuator 405. Actuator 405 and coil 18 are similar to the actuator and coil shown in FIG. 10 and are positioned in generally the same position on the disk drive. A crash stop 420 limits the rotation of actuator 405 in a clockwise direction.

Shaft 402 is fitted into a latch base 406, which includes raised portions 407, 408a and 408b. Opposing surfaces of raised portion 407 and latch member 401 create a cavity 409 in which an inertial ball 410 is placed. Similarly, opposing surfaces of latch member 401 and raised portions 408a and 408b form a cavity 411 in which an inertial ball 412 is placed. Latch member 401 is biased in the position shown in FIG. 16 by a whisker spring 413 which is held in a flexed position by nubs 414 and 415 on base 406 and nub 416 on latch member 401. A cover plate (not shown) is mounted over the top of base 406 so as to retain balls 410 and 412 in cavities 409 and 411, respectively.

The shapes of the surfaces which define cavities 409 and 411 are very important to the functioning of inertial latch 400. Cavity 409 is bounded by surfaces 409a and 409b which are oriented to one another at an angle which opens generally downward. Another portion of cavity 409 is bounded by surfaces 409c and 409d which are oriented to one another at an angle which faces generally upward. Similarly, cavity 411 is bounded in part by surfaces 411a and 411b which are oriented to form an angle which opens generally downward and by surfaces 411c and 411d which are oriented so as to form an angle which opens generally upward. These pairs of opposing surfaces around cavities 409 and 411, respectively, need not be directed upwards and downwards as in FIG. 16, but each pair should open generally in a direction opposite to the other pair in one of the cavities 409 and 411.

Balls 410 and 412 are preferably made of brass because brass has a high specific gravity, is corrosion resistant, and is non-magnetic. The latter characteristic allows the inertial latch to be located near to the magnet of a voice coil motor. Other materials having those characteristics could also be used for the balls, although in some applications it may not be necessary that the balls be corrosion resistant or non-magnetic. Spring 413 is preferably made of beryllium-copper alloy, which is non-magnetic and has a high yield strength.

Balls 410 and 412 serve as the inertial masses in this embodiment. Accordingly, latch member 401 should have a relatively low mass. Carbon-filled nylon has been found to be a suitable material for latch member 401 and latch base 406, because it has a high degree of stiffness (for resistance to deformation), a low specific gravity (for reduced mass), and a low coefficient of friction (for consistent mechanical interaction with balls 410 and 412).

Figure 17B:
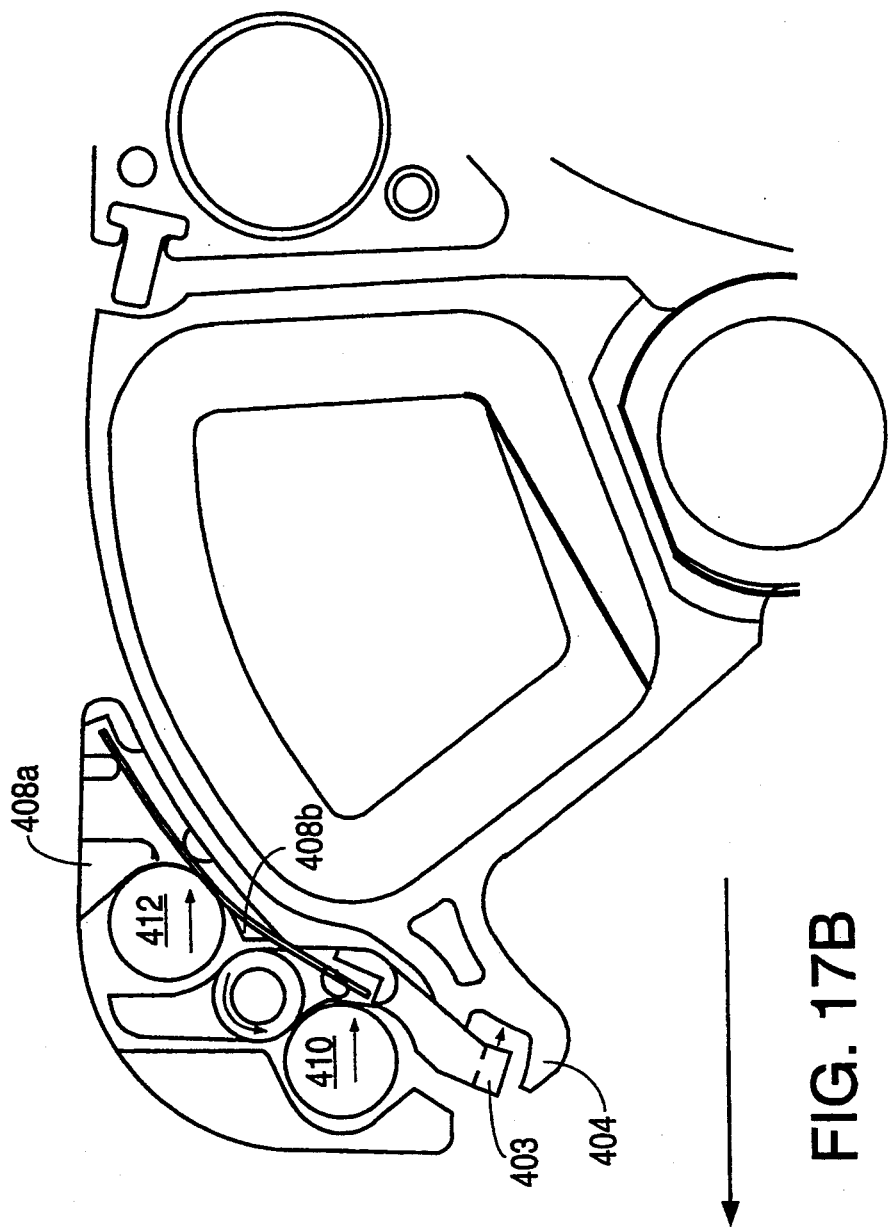

FIGS. 17A-17D illustrate the operation of inertial latch 400 in the presence of horizontal and vertical shock forces. FIG. 17A illustrates the response to a shock force directed to the right (+x). Assuming that the shock force is large enough to overcome the torque provided by spring 413, ball 412 pushes leftward on latch member 401, rotating it in a counterclockwise direction and causing tab 403 to enter catch 404. This prevents the actuator from rotating. Ball 410 simply presses against raised portion 407 of base 406 and has no effect on the inertial lock.

The situation in the presence of a shock force directed to the left (−x) is illustrated in FIG. 17B. In this situation, ball 410 presses rightward against latch member 401, causing it to rotate counterclockwise, with the same result as in FIG. 17A. Ball 412 presses against raised portions 408a and 408b and has no effect.

Figure 17C:
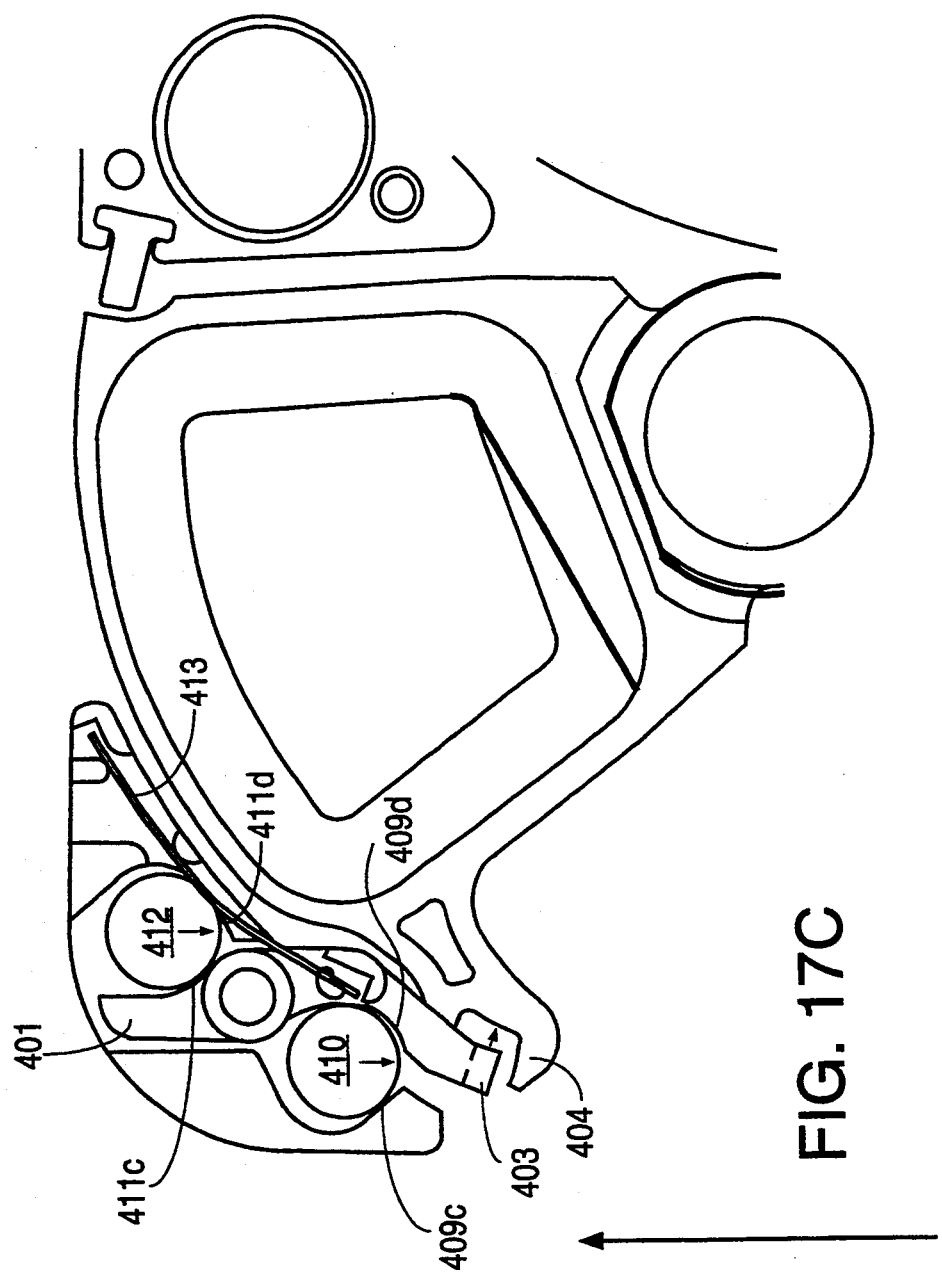

The situation in the presence of an upward shock force is illustrated in FIG. 17C. In this situation both balls 410 and 412 are operative. Ball 410 presses into the angular opening formed by surfaces 409c and 409d, and ball 412 is forced into the angular opening formed by surfaces 411c and 411d. In both instances, owing to the contours of surfaces of 409c, 409d, 411c and 411d, the effect is to cause latch member 401 to rotate in a counterclockwise direction, causing tab 403 to interdict catch 404.

Figure 17D:
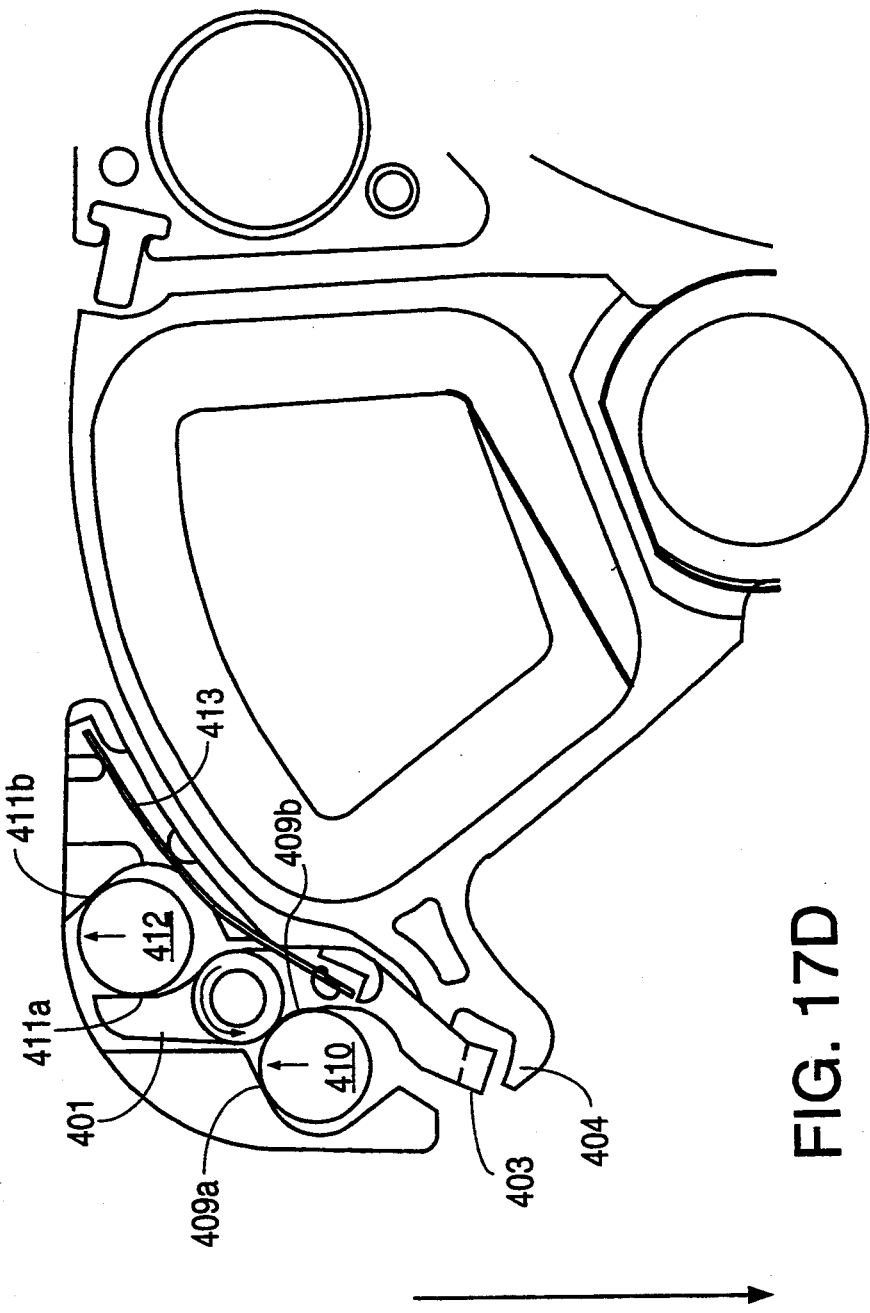

Finally, the situation in the presence of a downward shock force is illustrated in FIG. 17D. Ball 410 presses against surfaces 409a and 409b, and ball 412 presses against surfaces 411a and 411b. Both of these actions cause latch member 401 to rotate in a counterclockwise direction, with the result indicated above.

In each of the four situations described in FIGS. 17A-17D, the shock force must be of a sufficient magnitude such that the action of one or both of balls 410 and 412 is sufficient to overcome the opposing torque of spring 413. When the shock force has passed, spring 413 again takes over, and rotates latch member 401 to the position illustrated in FIG. 16.

Numerous variations of this embodiment will be apparent to those skilled in the art. For example, a wide variety of mechanisms may be used in place of whisker spring 413 to bias the inertial latch in the open position, including a torsion spring, a coil spring, a magnetic spring, or a leaf spring integral to the latch member. Disks, wedge shaped objects and other bodies of varying shape may be substituted for balls 410 and 412. The shapes of latch member 401 and base 406 may also be varied in numerous ways without departing from the broad principles of this invention.

Preferably inertial latch 400 operates in conjunction with a ramp detent arrangement of the kind illustrated in FIG. 3. In the event that the disk drive undergoes a clockwise angular acceleration the actuator is held in its rest position by the ramp. At a predetermined threshold acceleration (e.g., approximately 6,000 rad/sec$^2$), the ramp is unable to restrain the actuator, and the inertial latch is triggered.

In the event of a counterclockwise rotary shock, the actuator swings so as to impact crash stop 420, shown in FIG. 16. Since crash stop 420 is normally made of a resilient material, this can cause the actuator to bounce back and in the process overcome the resistance provided by the ramp. One advantage of the latch of this embodiment is that it may be triggered by an angular acceleration about the center of gravity of the disk drive in either the clockwise or counterclockwise direction. An angular acceleration of the disk drive, or a computer in which it is mounted, generally produces a linear acceleration at the position of the inertial latch (the magnitude of the linear acceleration being equal to the angular acceleration of the disk drive or computer times the distance between the center of rotation and the inertial latch).

Figure 18:
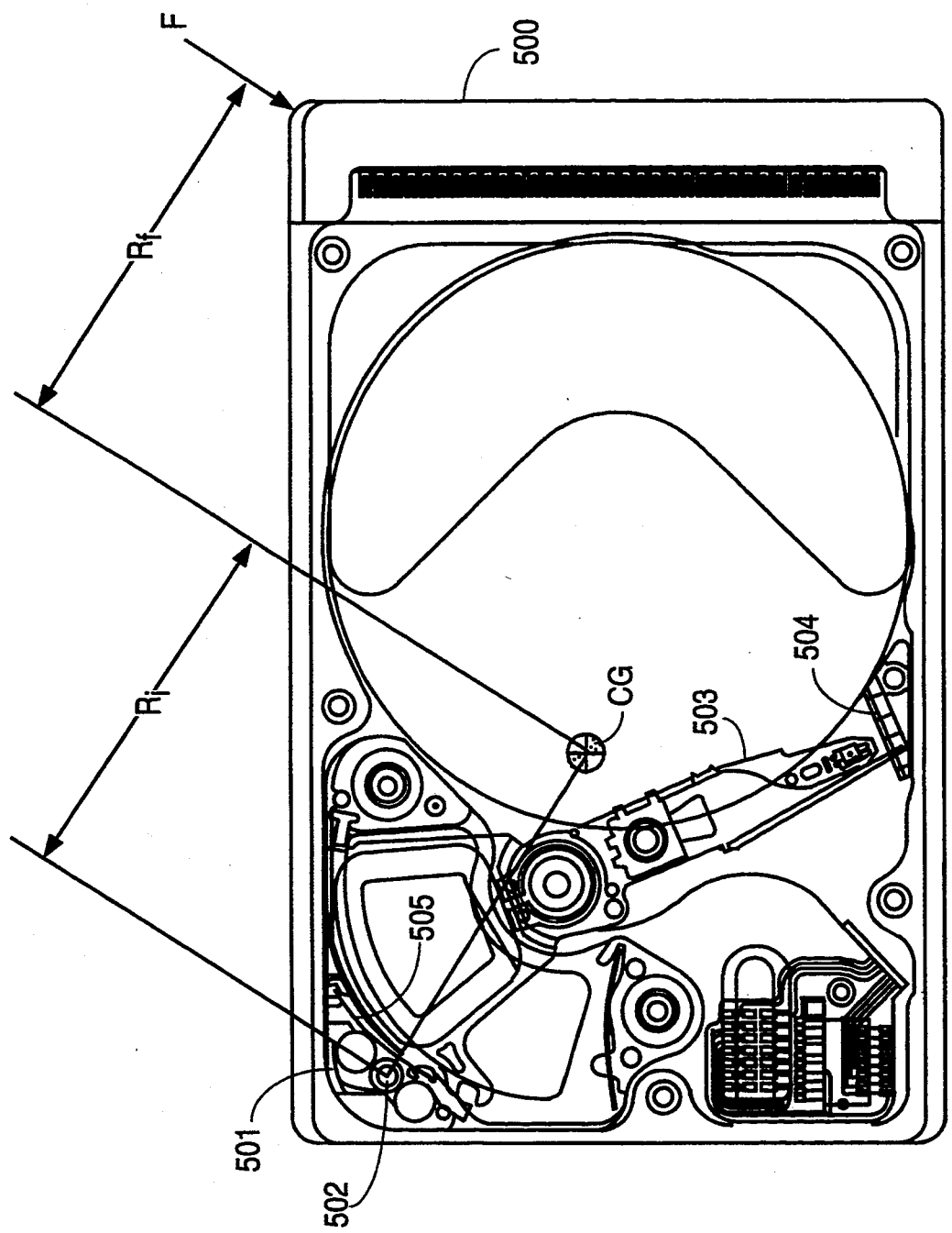
FIG. 18 helps to explain the acceleration experienced by the latch when a shock force is applied to the periphery of the disk drive.

For removable disk drives, the strongest shock forces normally occur when the drive is separated from its host computer or other instrument. In this situation, the disk drive acts as a free body, with shock forces being applied to its outer periphery. FIG. 18 illustrates a scenario which represents the worst case condition for engagement of the inertial lock (i.e., the linear acceleration due to the rotary acceleration of the disk drive subtracts from the linear acceleration of the inertial latch). In FIG. 18, point CG is the center of gravity of disk drive 500. An inertial latch 501 in accordance with this embodiment rotates about a shaft 502. $R_i$ represents the distance between point CG and shaft 502. Assume that a force F impacts disk drive 500 at a radial distance $R_f$ from point CG.

Actuator 503 is held in a detent 504 and inertial latch 501 contains a spring 505 which normally maintains the latch in an open condition.

In the presence of force F, the acceleration (A) of inertial latch 501 is given as:

$$A = \frac{F}{M} - \alpha R_i \quad (1)$$

where M and $\alpha$ are the mass and the angular acceleration, respectively, of disk drive 500. In turn, $$\alpha = \frac{FR_f}{J} \quad (2)$$

where J is the rotary inertia of disk drive 500.

Combining equations (1) and (2) gives:

$$A = \frac{\alpha J}{MR_f} - \alpha R_i \quad (3)$$

or $$A = R_i\alpha \left( \frac{J}{MR_iR_f} - 1 \right) \quad (4)$$

Let $\alpha_0$ equal the minimum angular acceleration of disk drive 500 that will rotate actuator 503 out of detent 504; and let $A_0$ equal the minimum acceleration of inertial latch that will overcome the force of spring 505 and trigger the latch. Accordingly, to ensure that inertial latch 501 engages before actuator 503 rotates out of detent 504, the following relationship must be observed.

$$A_0 < R_i\alpha_0 \left( \frac{J}{MR_iR_f} - 1 \right) \quad (5)$$

Figure 19A:
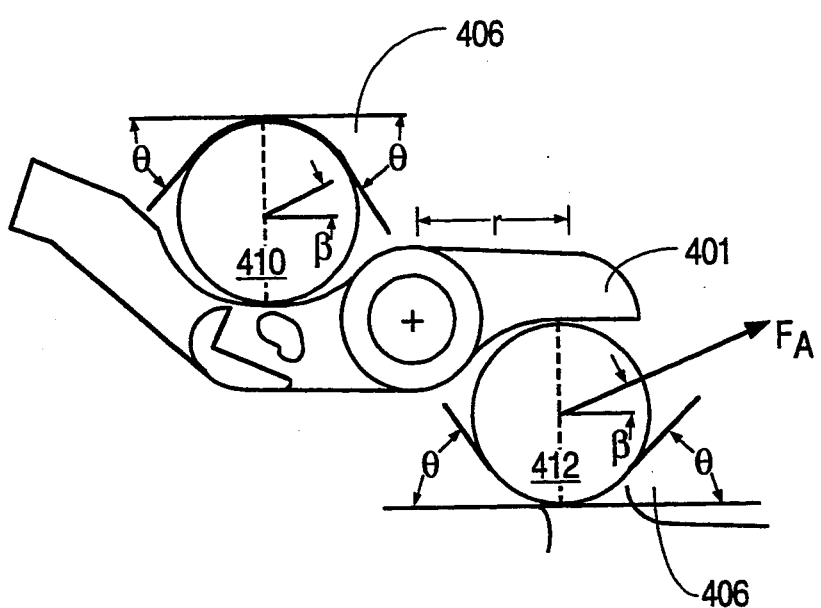
FIGS. 19A–19E help to explain the torque imposed on the latch member of the fourth embodiment in the presence of shock forces from various directions.

FIGS. 19A–19E help to illustrate the relationship between the linear acceleration applied to inertial lock 400 and the torque applied to the spring or other biasing means. FIG. 19A shows balls 410 and 412 juxtaposed to latch member 401. Balls 410 and 412 make contact with latch member 401 at a radial distance r from the pivot point of latch member 401. The surfaces of base 406 which enclose balls 410 and 412 are contoured at an angle $\theta$ with respect to the horizontal. The coefficient of a friction between each of balls 410 and 412 and latch member 401 and 406 is assigned to be zero in this analysis. The purpose of the analysis is to determine the value of $\theta$ which minimizes the extent to which the triggering of the latch varies as a function of the direction of the shock force.

Figure 19B:
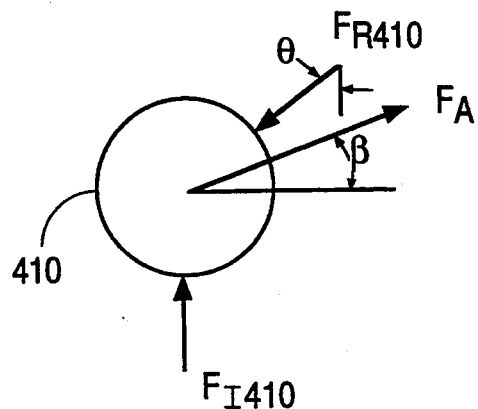
Figure 19C:
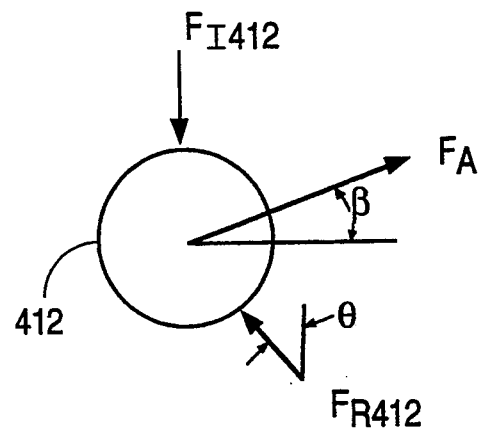
Figure 19D:
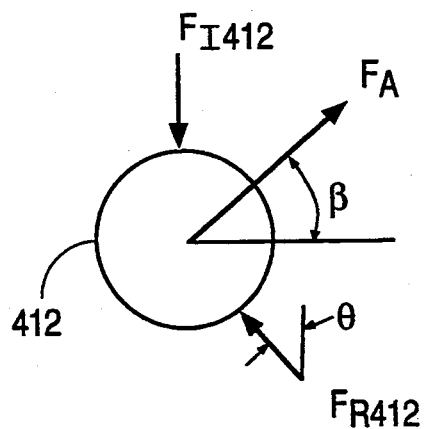
Figure 19E:
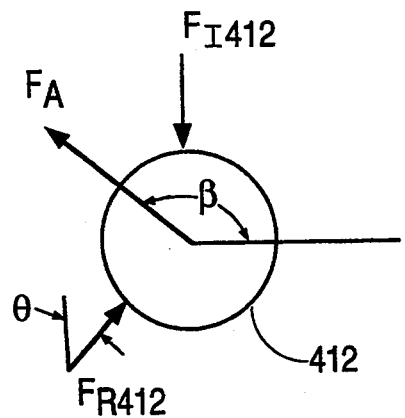

Assume that inertial latch 400 is subjected to a force $F_A$ inclined at an angle $\beta$ to the horizontal and that $-(90°-\theta)<\beta<(90°-\theta)$. FIGS. 19B and 19C illustrate the force vectors incident on balls 410 and 412, respectively. In FIG. 19B, $F_{R410}$ represents the force imposed on ball 410 by the base, and $F_{I410}$ represents the force imposed on ball 410 by latch member 401. In FIG. 19C, $F_{R412}$ represents the force imposed on ball 412 by the base and $F_{I412}$ represents the force imposed on ball 412 by latch member 401. Each of balls 410 and 412 is, of course, subject to the force $F_A$ which is felt by the inertial latch.

Referring to FIG. 19B and summing the horizontal and vertical components of the forces on ball 412 yields the following:

$$F_A \cos\beta = F_{R410} \sin\theta \quad (6)$$

$$F_{R410} = F_A \frac{\cos\beta}{\sin\theta} \quad (7)$$

$$F_{I410} = F_{R410} \cos\theta - F_A \sin\beta \quad (8)$$

$$F_{I410} = F_A \frac{\cos\theta \sin\beta}{\sin\theta} - F_A \sin\beta \quad (9)$$

Referring to FIG. 19C, the horizontal and vertical force summations for ball 412 are as follows:

$$F_A \cos\beta = F_{R412} \sin\theta \quad (10)$$

$$F_{R412} = F_A \frac{\cos\beta}{\sin\theta} \quad (11)$$

$$F_{I412} = F_{R412} \cos\theta + F_A \sin\beta \quad (12)$$

$$F_{I412} = F_A \frac{\cos\theta \cos\beta}{\sin\theta} + F_A \sin\beta \quad (13)$$

The torque $\tau$ applied to latch member 401 is expressed as follows:

$$\tau = r(F_{R410} + F_{I412}) \quad (14)$$

Substituting for $F_{I410}$ and $F_{I412}$ yields:

$$\tau = rF_A 2 \frac{\cos\theta \cos\beta}{\sin\theta} \quad (15)$$

$$\tau = 2r\frac{\cos\beta}{\tan\theta} F_A = 2r\left(\frac{\cos\beta}{\tan\theta}\right)ma \quad (16)$$

where m is the mass of balls 410 and 412 and a is the linear acceleration. Thus, the acceleration $a_0$ at which the inertial latch will be triggered if the spring or other biasing means provides a threshold torque equal to $\tau_0$ is as follows:

$$a_0 = \frac{\tau_0 \tan\theta}{2mr \cos\beta} \quad (17)$$

For $(90°-\theta)<\beta<90°$ (see FIG. 19D), the following relationships hold:

$$F_{I412} = F_A \left( \frac{\cos\theta \cos\beta}{\sin\theta} + \sin\beta \right) \quad (18)$$

$$F_{I410} = 0 \quad (19)$$

The torque provided by $F_{I412}$ is as follows:

$$\tau = rF_{I412} = \frac{rF_a}{\sin\theta}(\cos\theta\cos\beta + \sin\beta\sin\theta) \quad (20)$$

$$\tau = \frac{rma}{\sin\theta}(\cos(\beta - \theta)) \quad (21)$$

Solving for the acceleration required to trigger the latch:

$$a_0 = \frac{\tau \sin\theta}{rm \cos(\beta - \theta)} \quad (22)$$

For $90° < \beta < (90° + \theta)$ (see FIG. 19E), the force summations in the horizontal and vertical directions are as follows:

$$F_{R412} = F_A \frac{\cos\beta}{\sin\theta} \quad (23)$$

$$F_{R412} = F_A \sin\beta + F_{R412}\cos\theta \quad (24)$$

$$F_{R410} = 0 \quad (25)$$

Accordingly:

$$a_0 = \frac{-\tau_0}{rm}\left(\frac{\sin\theta}{\cos(\beta-\theta)}\right) \quad (26)$$

For $(90° + \theta) < \beta < 180°$:

$$a_0 = -\frac{\tau_0}{rm}\left(\frac{\tan\theta}{\cos(\beta-\theta)}\right) \quad (27)$$

Figure 20:
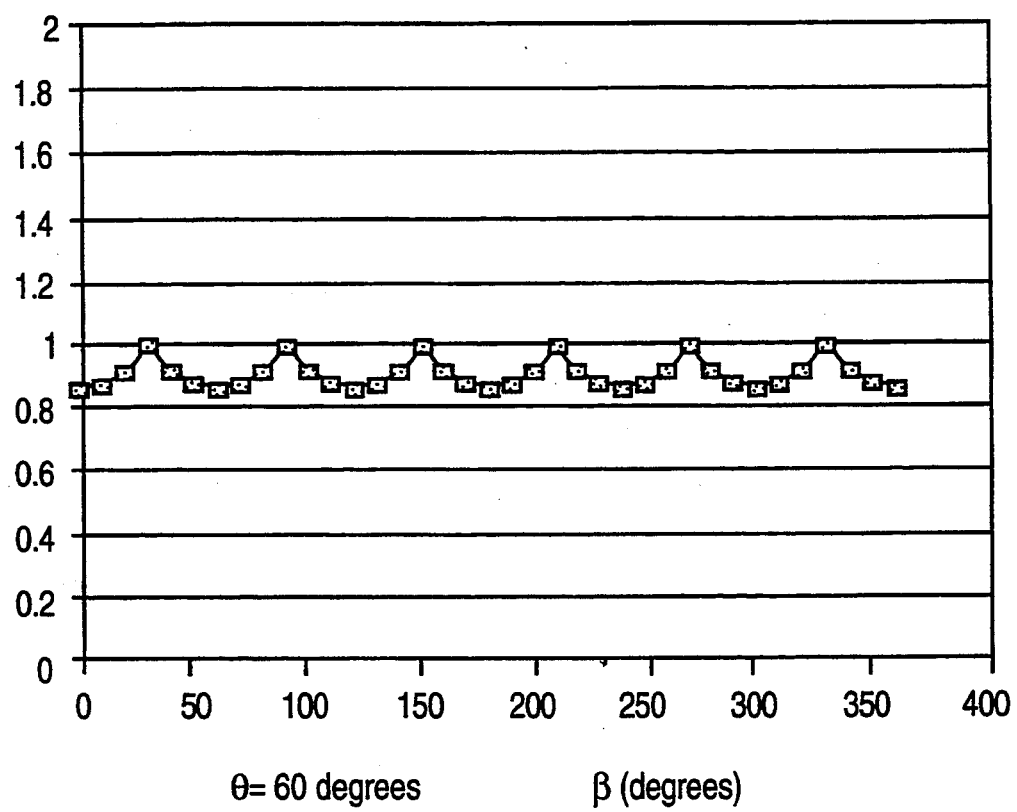
FIG. 20 shows the acceleration required to trigger the latch as a function of the direction of the shock force.

The torque imposed by latch member 401 on a spring or other biasing element is a function of the angle $\theta$ and of the direction of the shock force (represented by $\beta$). FIG. 20 shows the magnitude of the normalized linear acceleration of the latch required to engage the actuator, as a function of $\beta$, with $\theta$ equal to 60°. The maximum variation is about 15%. The optimal value of $\theta$ is close to 60°.

The actuation of the inertial latch can be extended to operation in three dimensions by rotating the contoured surfaces of latch base 406 about an axis through the center of each ball. The axes for balls 410 and 412 are illustrated by the hatched lines in FIG. 19A. This yields generally conical surfaces in base 406 which enclose balls 410 and 412.

The foregoing examples of various embodiments and aspects in accordance with this invention are intended to be illustrative only and not in any manner limiting of the full scope of this invention. The principles of this invention are applicable to devices other than disk drives and may be used in any situation where it is desired to trigger a rotary member to a predetermined position when the rotary member is subjected to a shock force. Those skilled in the art will be able to recognize or conceive of numerous alternative embodiments which are within the broad scope and principles of this invention.

I claim:

1. In a disk drive, an inertial latch for restraining an actuator in said disk drive, said latch comprising:
   a pivotable latch member;
   a base; and
   a first inertial body;
   said latch member including a first surface and said base including a second surface, said first and second surfaces being oriented to each other at a first predetermined angle when said latch member is in an open position, said first inertial body being positioned between said first and second surfaces so as to undergo translational motion and make contact with said first and second surfaces and thereby pivot said latch member to a closed position upon said translational motion, wherein said actuator is restrained when said disk drive is subjected to a shock force from a first direction.

2. The inertial latch of claim 1 wherein said latch member includes a third surface and said base includes a fourth surface, said third and fourth surfaces being oriented to each other at a second predetermined angle when said latch member is in an open position, said first inertial body being positioned between said third and fourth surfaces so as to make contact with said third and fourth surfaces and thereby move said latch member to said closed position wherein said actuator is restrained when said disk drive is subjected to a shock force from a second direction.

3. The inertial latch of claim 1 further comprising a second inertial body positioned between said latch member and said base.

4. The inertial latch of claim 3 wherein said first and second inertial bodies are positioned generally on opposite sides of an axis of rotation of said latch member.

5. The inertial latch of claim 3 wherein each of said first and second inertial bodies comprises a ball.

6. The inertial latch of claim 1 comprising a biasing element operative against said latch member.

7. The inertial latch of claim 6 wherein said biasing element comprises a spring.

8. The inertial latch of claim 1 wherein said first inertial body exerts a force against said latch member and not against said base when said disk drive is subjected to a shock force in a second direction.

9. The inertial latch of claim 8 wherein said first inertial body exerts a force against said base and not said latch member when said disk drive is subjected to a shock force in a third direction.

10. The inertial latch of claim 1 wherein said latch member includes a means for energizing said actuator when said latch member is in said closed position.

11. An inertial latch for restraining an actuator in a disk drive, said inertial latch comprising:
    a pivotable latch member;
    a base; and
    first and second inertial bodies;
    wherein said latch member and said base together define a first cavity wherein said first inertial body is positioned and a second cavity
    wherein said second inertial body is positioned, at least one of said first and second inertial bodies undergoing translational motion and contacting said latch member so as to pivot said latch member to a closed position upon said translational motion when said disk drive is subject to a shock force.

12. The inertial latch of claim 11 wherein said latch member pivots about an axis, said first and second cavities being located generally on opposite sides of said axis.

* * * * *